(12) United States Patent
Iguchi

(10) Patent No.: US 8,572,531 B2
(45) Date of Patent: Oct. 29, 2013

(54) TIMING VERIFICATION SUPPORT DEVICE GENERATING SECOND CIRCUIT DATA INCLUDING CIRCUIT ELEMENTS IDENTIFIED FROM FIRST CIRCUIT DATA AND TIMING VERIFICATION SUPPORT METHOD

(75) Inventor: Katsumi Iguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/406,906

(22) Filed: Feb. 28, 2012

(65) Prior Publication Data

US 2012/0233580 A1    Sep. 13, 2012

(30) Foreign Application Priority Data

Mar. 8, 2011    (JP) .................................. 2011-050123

(51) Int. Cl.
G06F 17/50    (2006.01)
(52) U.S. Cl.
USPC ............................ 716/108; 716/106; 716/113
(58) Field of Classification Search
USPC ......................... 716/106, 108, 113
See application file for complete search history.

(56) References Cited

U.S. PATENT DOCUMENTS

| | | | | |
|---|---|---|---|---|
| 6,088,821 A | * | 7/2000 | Moriguchi et al. | 714/724 |
| 2002/0161947 A1 | * | 10/2002 | Ikeda et al. | 710/38 |
| 2007/0143731 A1 | * | 6/2007 | Tsuchiya | 716/18 |

FOREIGN PATENT DOCUMENTS

| | | |
|---|---|---|
| JP | 06-174781 | 6/1994 |
| JP | 2001-273338 | 10/2001 |

* cited by examiner

*Primary Examiner* — Vuthe Siek
(74) *Attorney, Agent, or Firm* — Staas & Halsey LLP

(57) ABSTRACT

A timing verification support device includes: a storage device to store first circuit data of a semiconductor integrated circuit; a search unit to identify, in the first circuit data, a plurality of circuit elements including a designated circuit element designated as a timing verification target and at least one circuit element included in a path traced when performing timing verification at a boundary between the designated circuit element and a portion other than the designated circuit element; and a generation unit to generate second circuit data for the timing verification including circuit data of the plurality of circuit elements.

16 Claims, 32 Drawing Sheets

TIMING VERIFICATION SUPPORT DEVICE GENERATING SECOND CIRCUIT DATA INCLUDING CIRCUIT ELEMENTS IDENTIFIED FROM FIRST CIRCUIT DATA AND TIMING VERIFICATION SUPPORT METHOD

CROSS-REFERENCE TO RELATED APPLICATIONS

This application claims the benefit of priority from Japanese Patent Application No. 2011-50123 filed on Mar. 8, 2011, the entire contents of which are incorporated herein by reference.

FIELD

Embodiments discussed herein relate to a timing verification of a semiconductor integrated circuit.

BACKGROUND

In a design of a semiconductor integrated circuit, timing verification for determining whether or not data transfer is normally performed is performed. In the timing verification, between two sequential circuits, for example, Flip Flops (hereinafter, described as FF), where data transfer is performed, a data path delay and a clock path delay are calculated in consideration of the electric characteristic of the semiconductor integrated circuit at an operation time. For example, it is checked whether or not data is transferred within a certain clock cycle (setup timing check), or it is checked whether or not data transfer is too early (hold timing check).

Related art is disclosed in Japanese Laid-open Patent Publication No. 2001-273338, Japanese Laid-open Patent Publication No. 6-174781, or the like.

SUMMARY

According to an aspect of the embodiment, a timing verification support device includes: a storage device to store first circuit data of a semiconductor integrated circuit; a search unit to identify, in the first circuit data, a plurality of circuit elements including a designated circuit element designated as a timing verification target and at least one circuit element included in a path traced when performing timing verification at a boundary between the designated circuit element and a portion other than the designated circuit element; and a generation unit to generate second circuit data for the timing verification including circuit data of the plurality of circuit elements.

Additional advantages and novel features of the invention will be set forth in part in the description that follows, and in part will become more apparent to those skilled in the art upon examination of the following or upon learning by practice of the invention.

DESCRIPTION OF EMBODIMENTS

In the design of a large-scale semiconductor integrated circuit, for example, a chip, the entirety of the chip is divided into functional blocks, and design is performed in parallel in units of functional blocks. A large functional block is further divided into a plurality of functional blocks of a low level hierarchy, and parallel design is performed. Therefore, a design time may be reduced.

Timing verification between functional blocks, for example, the timing verification of a functional block boundary may be performed at a chip level. When the timing verification of a functional block boundary is performed, the circuit database of a semiconductor chip is loaded into a memory.

Therefore, a memory capacity may increase or a load time may be lengthened. Data other than the functional block of a verification target may be processed. The verification result of the semiconductor chip may increase.

The operation timing of the semiconductor integrated circuit including a macro is verified. In the timing verification of a functional block boundary, using a boundary delay calculation tool, a particular boundary delay table may be generated that indicates a dependence property between a physical quantity given to an external terminal and a boundary delay time.

The timing check of a custom logic integrated circuit (Integrated Circuit) including a large-scale macro may include a data sheet timing definition file in which the timing specification of the large-scale macro is described, a gate level netlist file defining internal logic, probe process for taking out a state value at a large-scale macro boundary during a simulation of its entirety, and a probe interface file used for interfacing a simulation result obtained by probing the state value. The constraint condition of the data sheet timing definition file may be checked. A check tool outputs regulation violation and an undetected timing error item list. Timing check is performed between the large-scale macro boundary and user logic.

Figure 1:
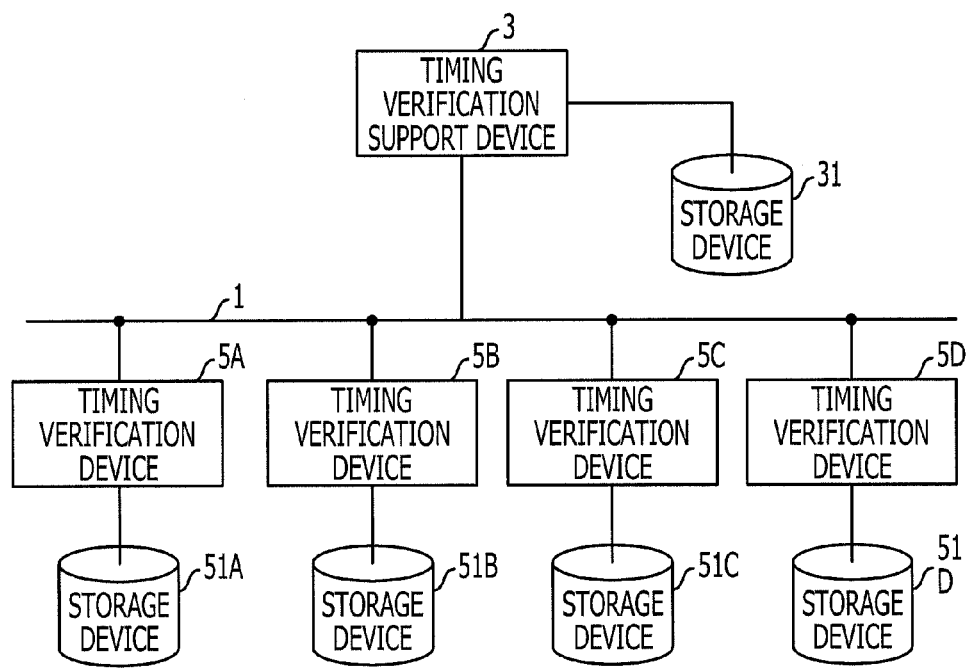
FIG. 1 illustrates an exemplary system.

FIG. 1 illustrates an exemplary system. In the system, a timing verification support device 3 and a plurality of timing verification devices 5, for example, timing verification devices 5A to 5D, are coupled to a network 1. For example, using the timing verification device 5, the designer of a functional block may perform timing verification at the boundary of the functional block. Using data generated by the timing verification support device 3, timing verification may be performed. The timing verification support device 3 may include a memory whose capacity is larger than the capacity of the timing verification device 5. The processing capacity of the timing verification support device 3 may be higher than the processing capacity of the timing verification device 5.

The timing verification support device 3 may include the whole semiconductor integrated circuit of a timing verification target, for example, a storage device 31 storing therein circuit data at a chip level. The circuit data includes macro information, delay information, and connection information between circuit elements. The timing verification device 5 may include a storage device 51 storing therein the circuit data of the functional block of a timing verification target and circuit data at the chip level.

Figure 2:
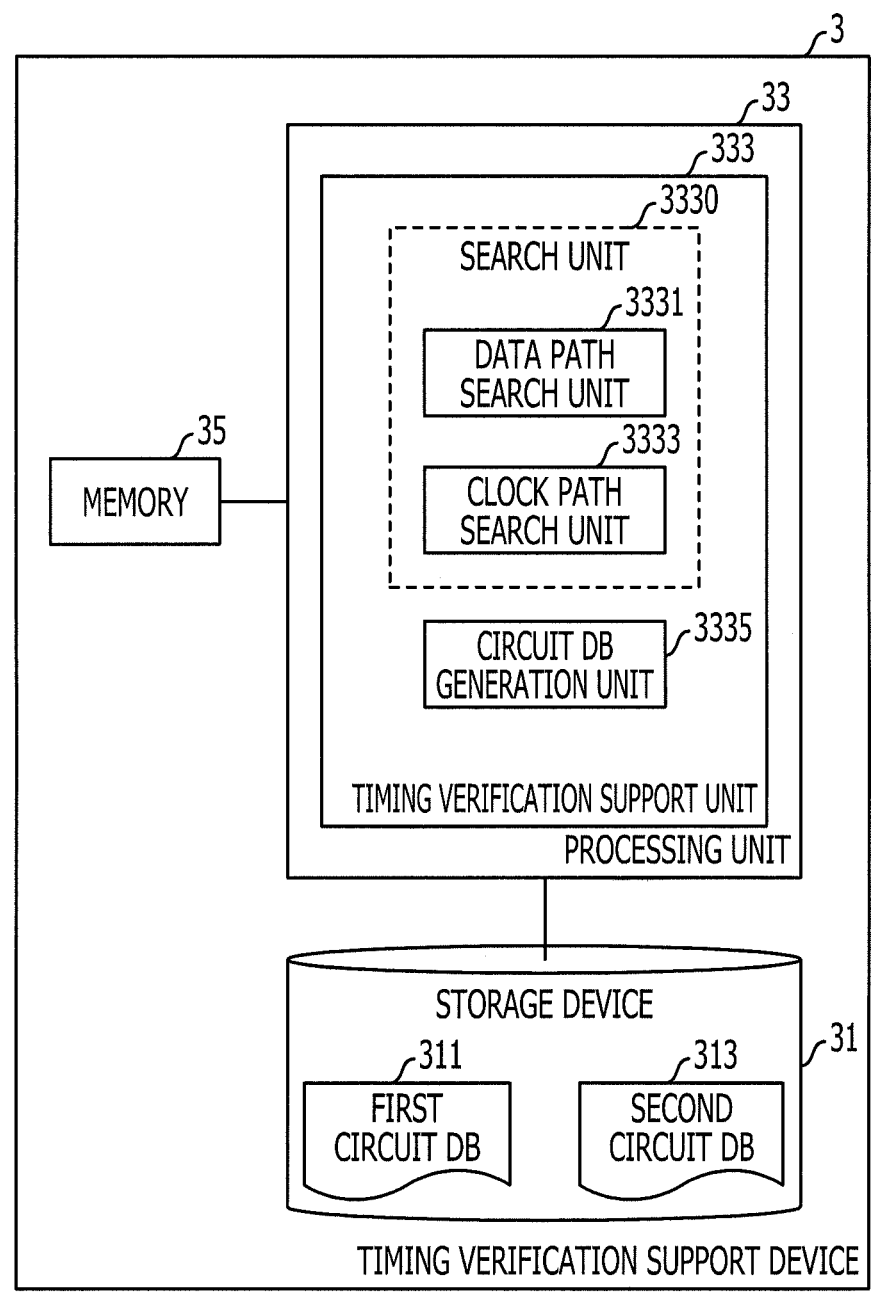
FIG. 2 illustrates an exemplary timing verification support device.

FIG. 2 illustrates an exemplary timing verification support device. The timing verification support device illustrated in FIG. 2 may be the timing verification support device 3 illustrated in FIG. 1. The timing verification support device 3 includes a processing unit 33, a storage device 31, and a memory 35. The processing unit 33 includes a timing verification support unit 333. The timing verification support unit 333 includes a circuit DB generation unit 3335 and a search unit 3330 including a data path search unit 3331 and a clock path search unit 3333. The timing verification support unit 333 reads circuit data stored in the storage device 31 into the memory 35, and processes the circuit data to store a processing result in the storage device 31. For example, a first circuit DB 311 corresponding to circuit data at the chip level may be stored in the storage device 31. The timing verification support unit 333 reads the first circuit DB 311 into the memory 35, and processes the first circuit DB 311 to store a second circuit DB 313 corresponding to a processing result in the storage device 31. The size of the second circuit DB 313 may be smaller than the size of the first circuit DB 311.

Figure 3:
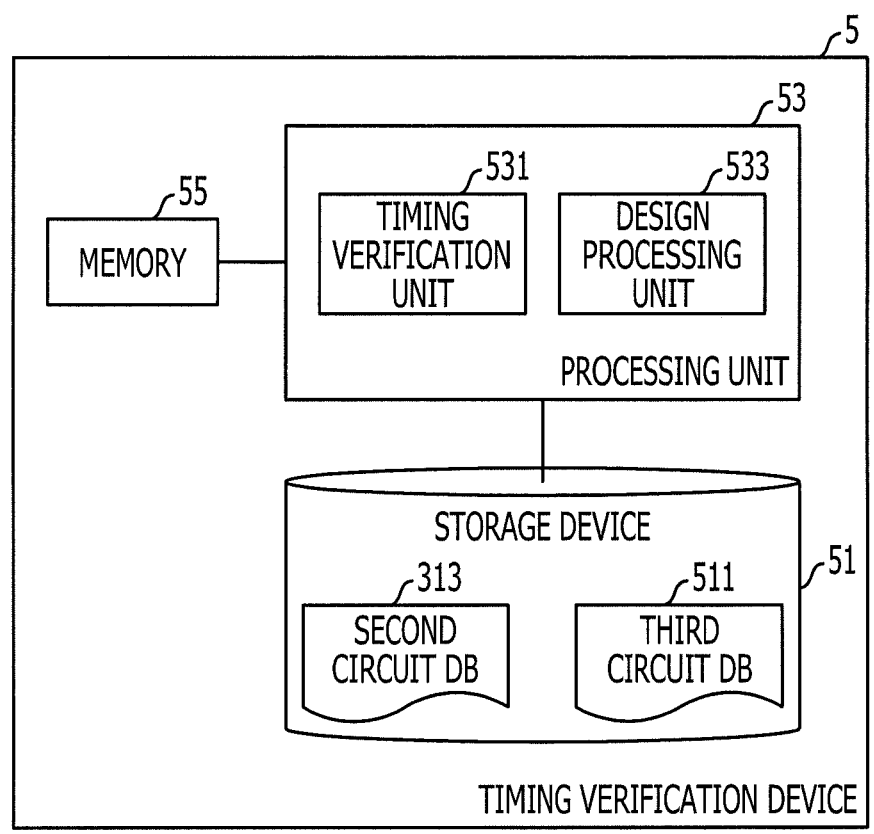
FIG. 3 illustrates an exemplary timing verification device.

FIG. 3 illustrates an exemplary timing verification device. The timing verification device illustrated in FIG. 3 may be the timing verification device 5 illustrated in FIG. 1. The timing verification device 5 includes a storage device 51, a processing unit 53, and a memory 55. The processing unit 53 includes a timing verification unit 531 and a design processing unit 533. The timing verification unit 531 reads circuit data stored in the storage device 51 into the memory 55, and performs a process for an existing timing verification on the circuit data to output a processing result. The design processing unit 533 may include a tool or the like used for performing the design change of a functional block or the like. The second circuit DB 313 generated in the timing verification support device 3 and a third circuit DB 511 corresponding to the circuit data of a functional block to be designed or the like are stored in the storage device 51. The timing verification unit 531 may read the second circuit DB 313 and the third circuit DB 511 stored in the storage device 51 into the memory 55, generate data for timing verification, and perform the process for the existing timing verification.

Figure 4:
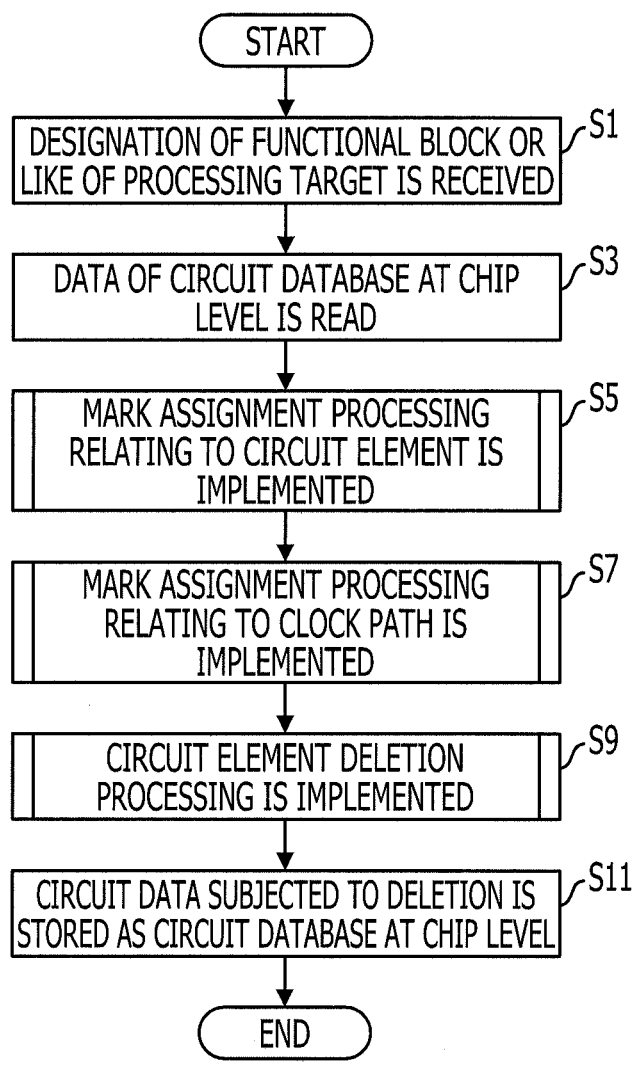
FIG. 4 illustrates an exemplary timing verification process.
Figure 5:
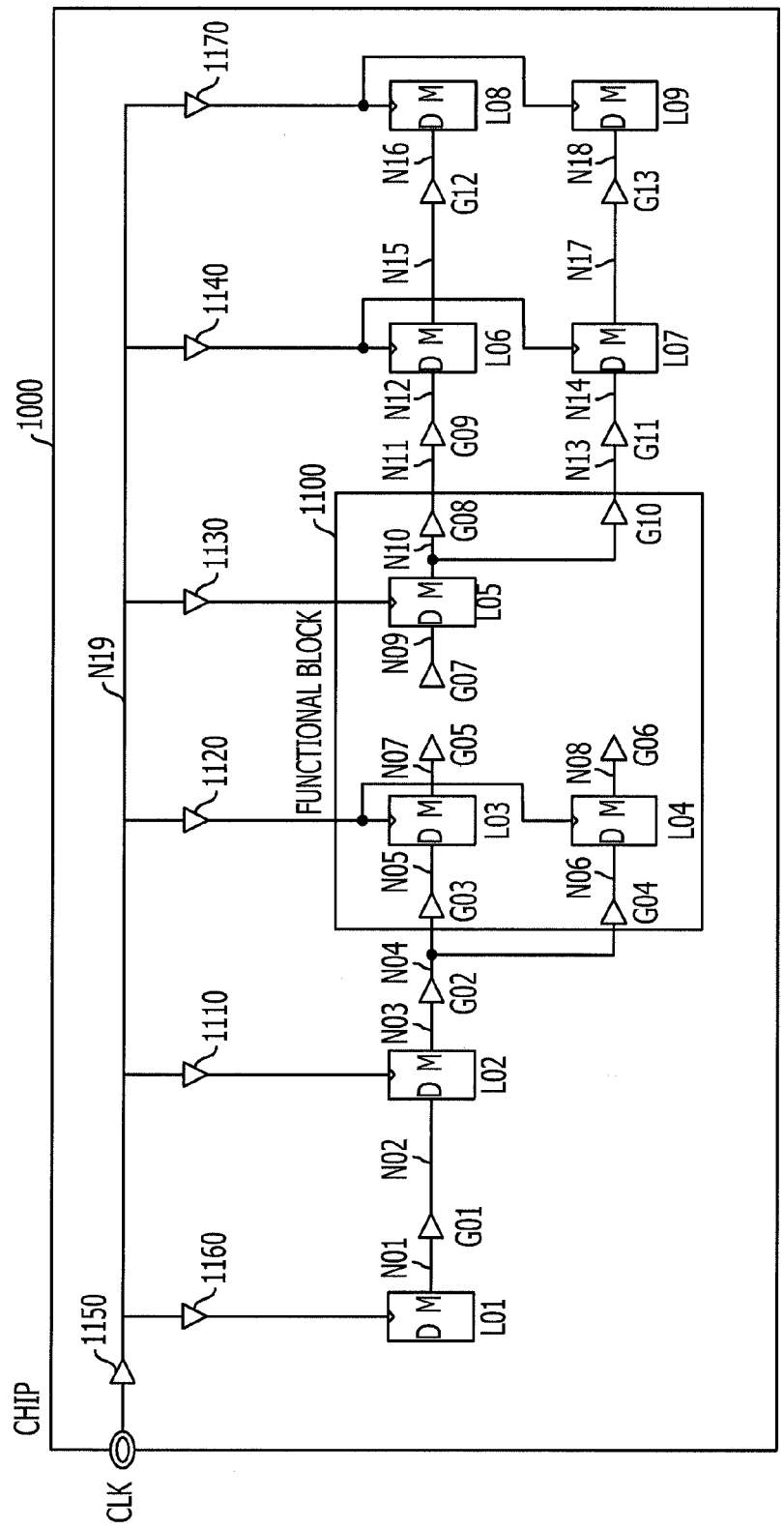
FIG. 5 illustrates an exemplary chip.

FIG. 4 illustrates an exemplary timing verification process. The timing verification process illustrated in FIG. 4 may be executed by the system illustrated in FIG. 1. For example, in an operation S1, the timing verification support unit 333 in the timing verification support device 3 illustrated in FIG. 1 or FIG. 2 receives an instruction for starting process and the designation of the functional block or the like of a processing target, from a designer, and stores, in the memory 35, data for identifying the functional block or the like of a processing target. The processing target may be designated in units of functional blocks, and a circuit within an arbitrary region may be designated. FIG. 5 illustrates an exemplary chip. A chip 1000 illustrated in FIG. 5 may include a functional block 1100 of a processing target. The functional block 1100 includes FFs (L03 to L05), gates G03 to G08 and G10, and nets N05 to N10. The chip 1000 includes circuits other than the functional block 1100. For example, a circuit element is extracted that is included in a path to be traced when timing verification is performed at a functional block boundary. "M" in the FF indicates an output terminal, and "D" in the FF indicates an input terminal. A triangular mark located at the upper side of the FF indicates a clock terminal. A clock may be supplied from an external clock terminal CLK to the FF through a buffer.

Figure 6:
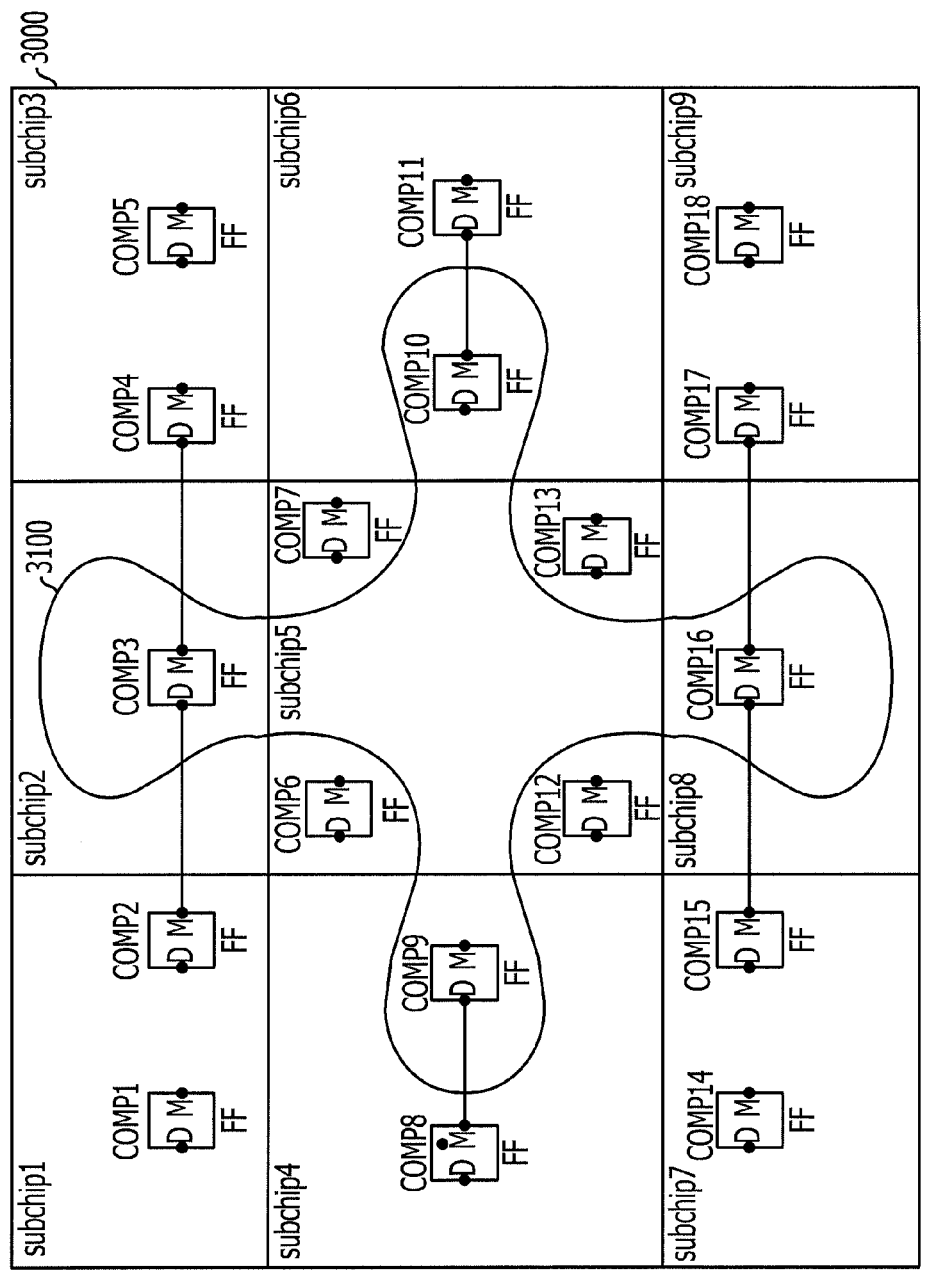
FIG. 6 illustrates an exemplary chip.

FIG. 6 illustrates an exemplary chip. A chip 3000 illustrated in FIG. 6 may include a functional block, for example, subchips 1 to 9. Separately from the functional block boundary, for example, a processing target region 3100 may be designated. The processing target region 3100 includes FFs (COMP3, COMP9, COMP10, and COMP16). Portions of the functional block 2, the functional block 4, the functional block 5, the functional block 6, and the functional block 8 may be included in the processing target region 3100.

Figure 7A:
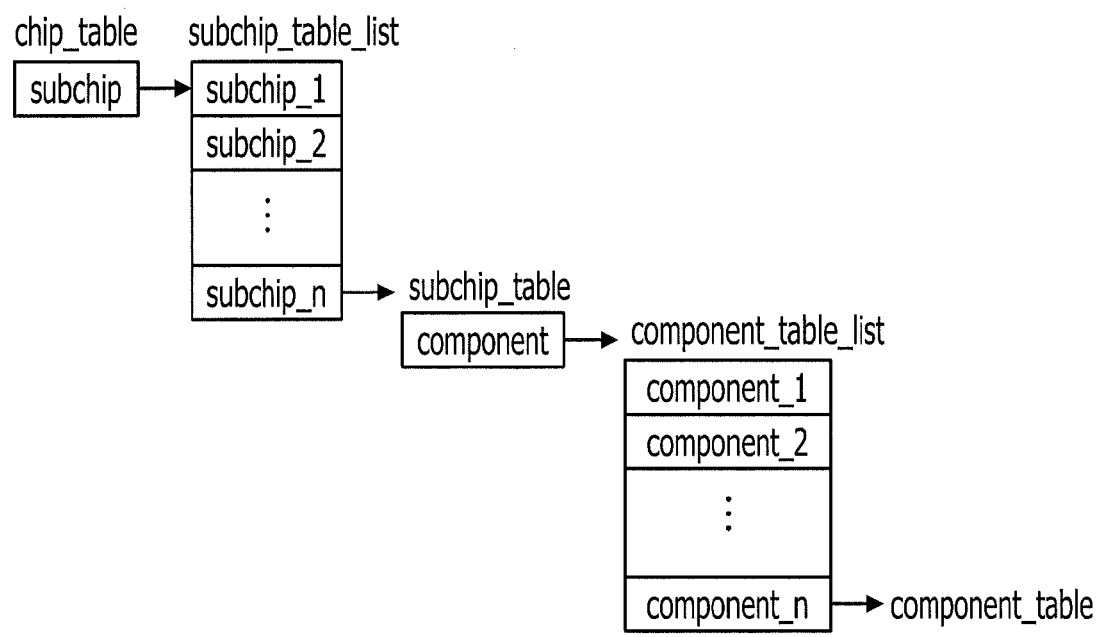
FIG. 7A and FIG. 7B illustrate an exemplary table structure.
Figure 7B:
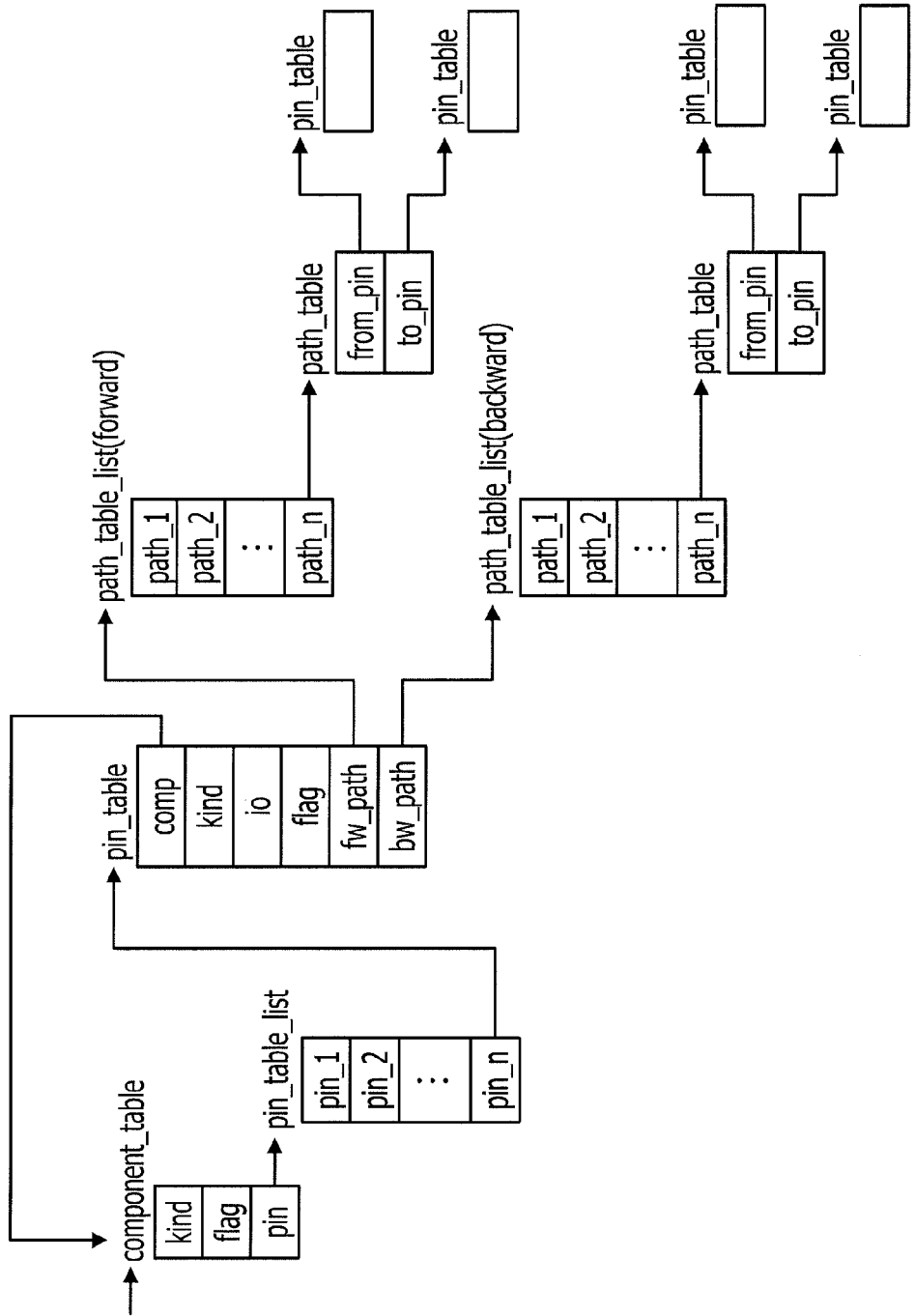

In an operation S3, the timing verification support unit 333 reads, into the memory 35, the data of the first circuit DB 311 corresponding to circuit data at a chip level. FIG. 7A and FIG. 7B illustrate an exemplary table structure. For example, the data of the first circuit DB 311 may include the table structure illustrated in FIG. 7A and FIG. 7B. As illustrated in FIG. 7A, a chip table (chip_table) holding the data of a chip may be linked to a subchip table list (subchip_table_list) including the list of functional blocks included in the chip. Each entry of the subchip table list holding the data of a functional block may be linked to a subchip table (subchip_table) of the functional block. The subchip table may be linked to a component table list (component_table_list) including the list of circuit elements included in the functional block. Each entry of the component table list may be linked to a component table (component_table) of circuit elements. FIG. 7B illustrates the structure of the component table. The component table includes the kind (kind) of a circuit element and a flag (flag) indicating whether or not the circuit element is a target FF, and may be linked to a pin table list (pin_table_list) of the circuit element. Each entry of the pin table list holding the data of a terminal of the circuit element may be linked to a pin table (pin_table) of a terminal included in the circuit element. The pin table includes the kind (kind) of a pin, the differentiation (io) between an input and an output, a flag (flag) indicating whether or not the pin is a pin included in the second circuit DB 313, and may be linked to path table lists (path_table_list (forward) and path_table_list (backward)) of paths (fw_path and bw_path) where the component table of a circuit element including the pin and the pin is coupled. Each entry of the path table lists (path_table_list (forward) and path_table_list (backward)) may be linked to a path table (path_table) of a path. The path table may be linked to a pin table of a source pin and a pin table of a designation pin. The flag may be initially set to "0". "Subchip" in the chip table indicates a pointer to a subchip table list. "Component" in the subchip table indicates a pointer to the component table list. "Pin" in the component table indicates a pointer to the pin table list.

Figure 8:
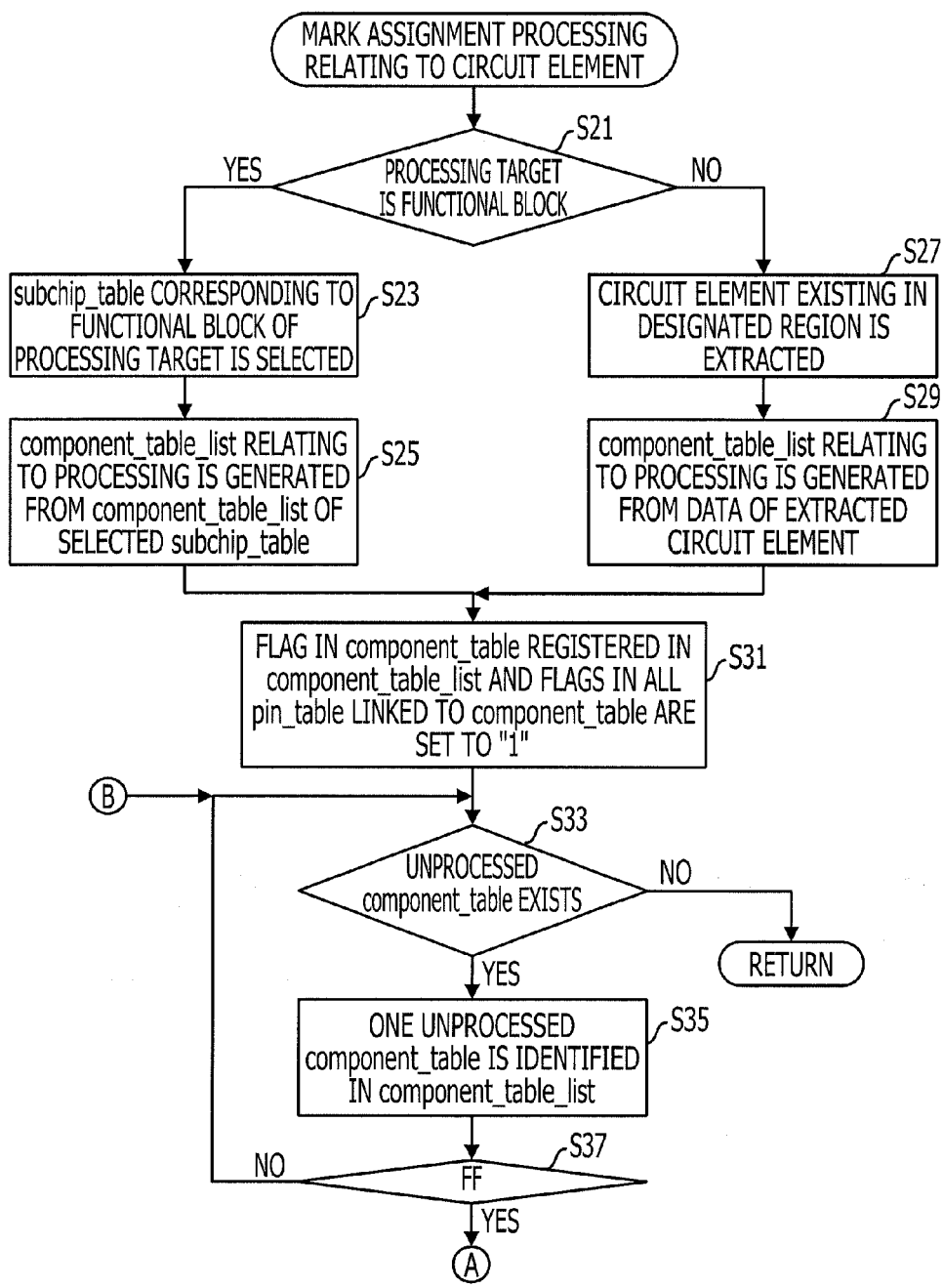
FIG. 8 illustrates an exemplary mark assignment process.

In an operation S5, the data path search unit 3331 in the search unit 3330 performs mark assignment process with respect to a circuit element. FIG. 8 illustrates an exemplary mark assignment process. In an operation S21, for example, the data path search unit 3331 illustrated in FIG. 2 determines whether or not a processing target is a functional block in the operation S1. When the processing target is the functional block, the data path search unit 3331 selects a subchip table (subchip_table) corresponding to the functional block of a processing target from a data structure deployed in the memory 35, in an operation S23. In an operation S25, a component table list (component_table_list) is generated from a component table list (component_table_list) of the selected subchip table, and stored in the memory 35. A component table (component_table) linked from the component table list of the selected subchip table is registered in the component table list. The process proceeds to an operation S31.

When the processing target is not a functional block and is within a processing target region, the data path search unit 3331 illustrated in FIG. 2 extracts a circuit element included in a designated region from the data structure deployed in the memory 35, in an operation S27, for example. In an operation S29, a component table list (component_table_list) is generated from the data of the extracted circuit element, and stored in the memory 35. The component table of a circuit element is extracted from the component table list of a functional block, and registered in the component table list. The process proceeds to an operation S31.

The data path search unit 3331 sets, to "1", the flag of the component table (component_table) registered in the component table list and the flag of a pin table (pin_table) linked to the component table, for example. The flags of all pin tables (pin_table) may be set to "1". The flags of a circuit element and a pin within the functional block or the like of a processing target are set to "1", and a circuit element having a flag set to "1" may not be deleted.

In an operation S33, the data path search unit 3331 determines whether or not an unprocessed component table exists in the component table list. When the unprocessed component table does not exist, the process is completed, and the process returns to the process of an invoker.

When the unprocessed component table exists in the component table list, the data path search unit 3331 identifies the unprocessed component table from the component table list in an operation S35. In an operation S37, the data path search unit 3331 determines whether the kind of the identified component table indicates an FF. When the kind is not an FF, since the functional block is not a search target, the process returns to the operation S33. When the kind is an FF, the processing proceeds to a process illustrated in FIG. 9 illustrating an exemplary mark assignment process, through a connector illustrated in FIG. 8.

Figure 9:
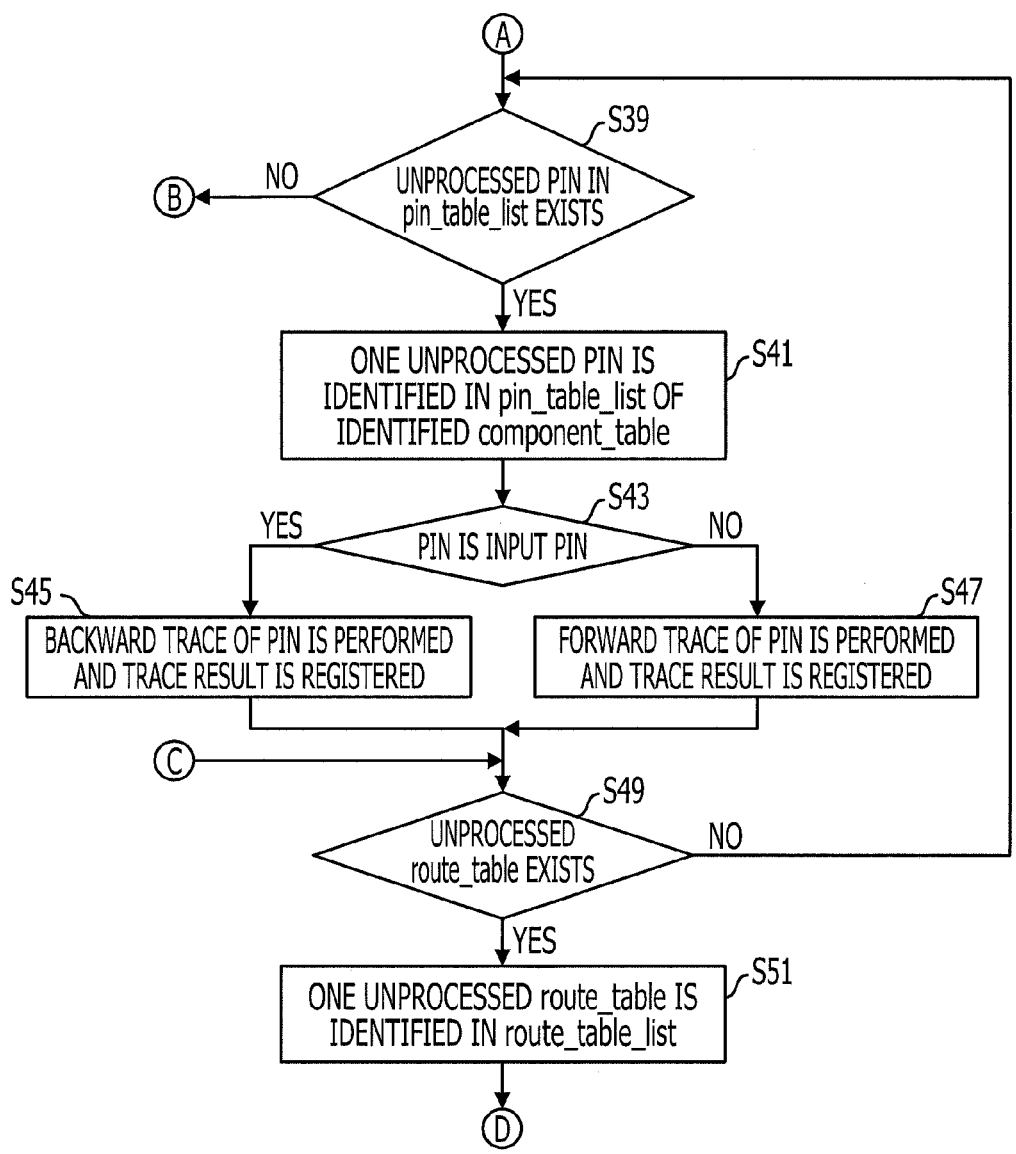
FIG. 9 illustrates an exemplary mark assignment process.

In an operation S39, the data path search unit 3331 illustrated in FIG. 9 determines whether an unprocessed pin exists in a pin table list (pin_table_list) linked from the identified component table. When the unprocessed pin does not exist, the process proceeds to the operation S33 illustrated in FIG. 8, through a connector B illustrated in FIG. 8. When the unprocessed pin exists, the data path search unit 3331 identifies one unprocessed pin from the pin table list linked from the identified component table, in an operation S41. In an operation S43, the data path search unit 3331 determines whether or not the kind of pin of the pin table of the identified pin indicates an input pin. When the kind of pin is an input pin, the data path search unit 3331 performs a backward trace with respect to the pin in an operation S45, and registers a trace result as the data structure of the backward trace. The process proceeds to an operation S49.

Figure 10:
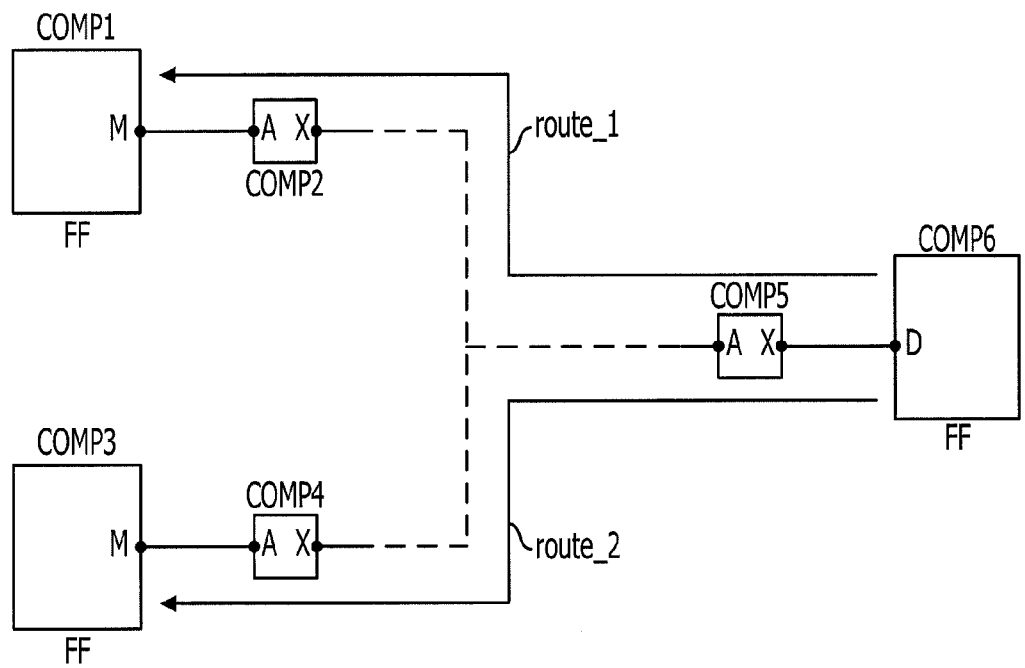
FIG. 10 illustrates an exemplary trace.
Figure 11:
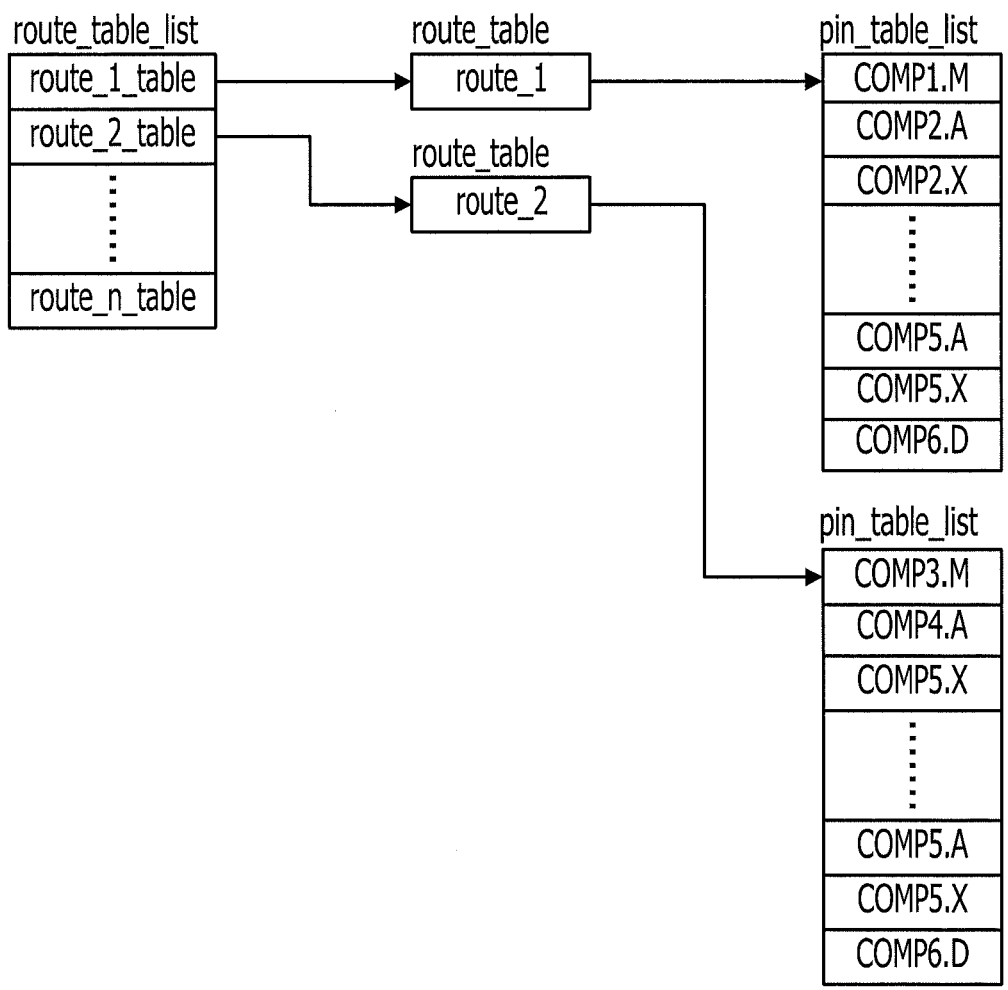
FIG. 11 illustrates an exemplary data structure.

FIG. 10 illustrates an exemplary trace. In FIG. 10, a circuit element, for example, an FF (COMP6), is disposed within the functional block or the like of a processing target. A data path trace may be performed, in a direction opposite to a direction in which data is propagated, on the data path from the input pin D of the FF (COMP6) to the output pin M of another FF. For example, a route 1 (route_1) leading to the FF (COMP1) and a route 2 (route_2) leading to the FF (COMP3) may be detected. The pin of a circuit element on the path is registered in a pin table list (pin_table_list). For example, in the route 1, a pin D of COMP6, a pin X of COMP5, a pin A of COMP5, . . . , a pin X of COMP2, a pin A of COMP2, and a pin M of COMP1 are detected. In the route 2, a pin D of COMP6, a pin X of COMP5, a pin A of COMP5, a pin X of COMP4, a pin A of COMP4, and a pin M of COMP3 are detected. FIG. 11 illustrates an exemplary data structure. The result of the trace illustrated in FIG. 10 may be held with the data structure of the backward trace illustrated in FIG. 11.

In FIG. 11, the list of searched routes is registered in a route table list (route_table_list), and the route table list is linked to the route table (route_table) of each route. The route table is linked to a pin table list (pin_table_list). A pin detected on the route is registered in the pin table list. A pin of the above-mentioned circuit element may be registered in the pin table list of the route 1. For example, COMP1.M indicates the pin M of the FF (COMP1). A pin of the above-mentioned circuit element may be registered in the pin table list of the route 2. For example, COMP3.M indicates the pin M of the FF (COMP3).

When the kind of pin of the pin table of the identified pin is an output pin, the data path search unit 3331 performs a forward trace with respect to the pin in an operation S47, and registers a trace result as the data structure of the forward trace. The process proceeds to an operation S49.

Figure 12:
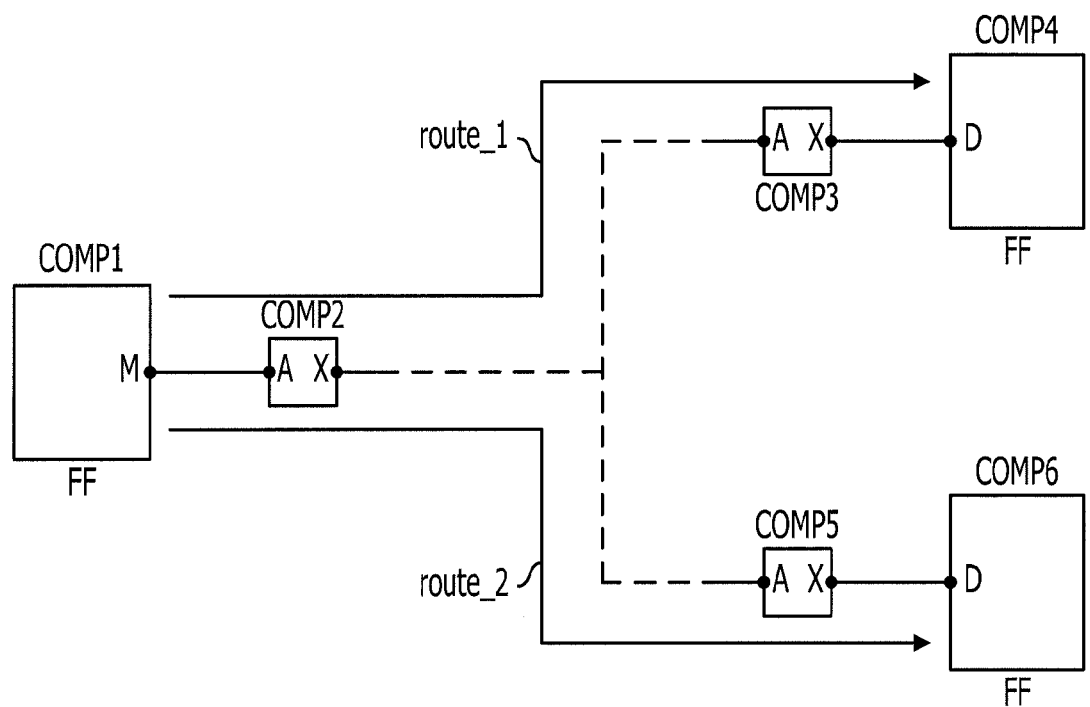
FIG. 12 illustrates an exemplary forward trace.
Figure 13:
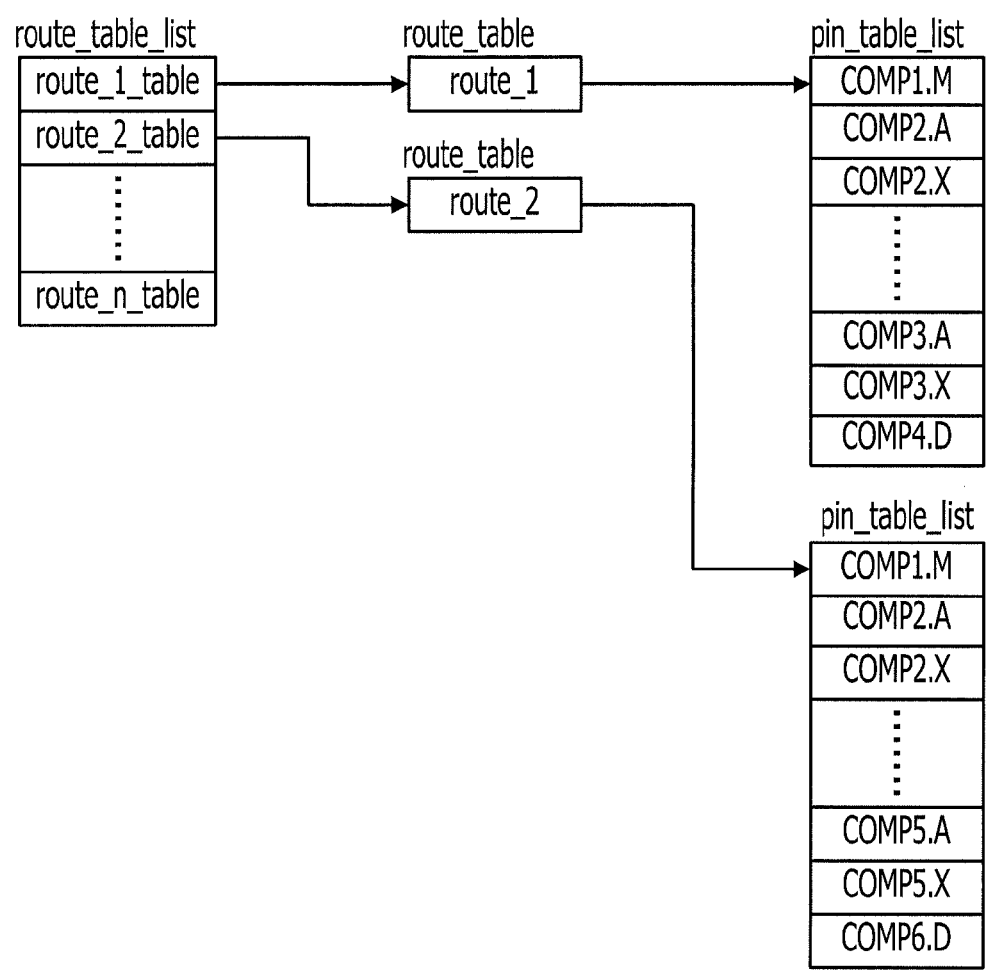
FIG. 13 illustrates an exemplary data structure.

FIG. 12 illustrates an exemplary forward trace. The forward trace illustrated in FIG. 12 may correspond to the operation S47 illustrated in FIG. 9. In FIG. 12, a circuit element, for example, the FF (COMP1) may be disposed within the functional block or the like of a processing target. In a forward direction, a data path, which leads from the output pin M of the FF (COMP1) to the input pin D of another FF, may be traced. In FIG. 12, a route 1 (route_1) leading to the FF (COMP4) and a route 2 (route_2) leading to a FF (COMP6) are detected. The pin of a circuit element on the path is registered a pin table list (pin_table_list). In the route 1 illustrated in FIG. 12, a pin M of COMP1, a pin A of COMP2, a pin X of COMP2, . . . , a pin A of COMP3, a pin X of COMP3, and a pin D of COMP4 may be detected. In the route 2 illustrated in FIG. 12, a pin M of COMP1, a pin A of COMP2, a pin X of COMP2, a pin A of COMP5, a pin X of COMP5, and a pin D of COMP6 may be detected. FIG. 13 illustrates an exemplary data structure. The result of the trace may be held with the data structure of the forward trace illustrated in FIG. 13.

In FIG. 13, a detected route is registered in a route table list (route_table_list), and the route table list is linked to the route table (route_table) of each route. The route table is linked to a pin table list (pin_table_list). A pin detected on the route is registered in the pin table list. The data structure of the backward trace may be substantially the same as or similar to the data structure of the forward trace.

For example, when the backward trace of the FF (L03) illustrated in FIG. 5, for example, the operation S45 illustrated in FIG. 9, is performed, a route including the input pin D of the FF (L03), the net N05, the gate G03, the net N04, the gate G02, the net N03, and the output pin M of the FF (L02) is detected. For example, when the backward trace of the FF (L04), for example, the operation S45, is performed, a route including the input pin D of the FF (L04), the net N06, the gate G04, the net N04, the gate G02, the net N03, and the output pin M of the FF (L02) is detected. The forward trace is performed from the output pin M of FF (L03), and a route including the output pin M of the FF (L03), the net N07, and the gate G05 may be detected. As for this route, for example, in the operation S31, a portion that is substantially the same as a portion in which a flag is turned on or a portion that is similar to the portion in which the flag is turned on may be traced. A route from the output pin M of the FF (L04) may be similar.

When the backward trace of the FF (L05) illustrated in FIG. 5, for example, the operation S47 illustrated in FIG. 9, is performed, a route including the output pin M of the FF (L05), the net N10, the gate G08, the net N11, the gate G09, the net N12, and the input pin D of the FF (L06) is detected. A route including the output pin M of the FF (L05), the net N10, the gate G10, the net N13, the gate G11, the net N14, and the input pin D of the FF (L07) is detected. The backward trace is performed from the input pin D of FF (L05), and a route including the input pin D of the FF (L05), the net N09, and the gate G07 is detected. As for the route, in Operation S31, a portion that is substantially the same as a portion in which a flag is turned on or a portion that is similar to the portion in which the flag is turned on may be traced.

When the backward trace of the FF (COMP3) illustrated in FIG. 6, for example, the operation S45 illustrated in FIG. 9, is performed, a route including the input pin D of the FF (COMP3) and the output pin M of the FF (COMP2) is detected. When the backward trace of the FF (COMP9), for example, the operation S45, is performed, a route including the input pin D of the FF (COMP9) and the output pin M of the FF (COMP8) is detected. When the backward trace of the FF (COMP16), for example, the operation S45, is performed, a route including the input pin D of the FF (COMP16) and the output pin M of the FF (COMP15) is detected. When the forward trace of the FF (COMP3), for example, the operation S47, is performed, a route including the output pin M of the FF (COMP3) and the input pin D of the FF (COMP4) is detected. When the forward trace of the FF (COMP10), for example, the operation S47, is performed, a route including the output pin M of the FF (COMP10) and the input pin D of the FF (COMP11) is detected. When the forward trace of the FF (COMP16), for example, the operation S47, is performed, a route including the output pin M of the FF (COMP16) and the input pin D of the FF (COMP17) is detected.

In the operation S49, the data path search unit 3331 determines whether an unprocessed route table (route_table) exists in the route table list (route_table_list) generated in the operation S45 or S47 illustrated in FIG. 9. When the unprocessed route table does not exist, the process returns from S49 to S39. In an operation S51, the data path search unit 3331 identifies one unprocessed route table in the route table list. The process proceeds to process illustrated in FIG. 14, through a connector D illustrated in FIG. 9.

Figure 14:
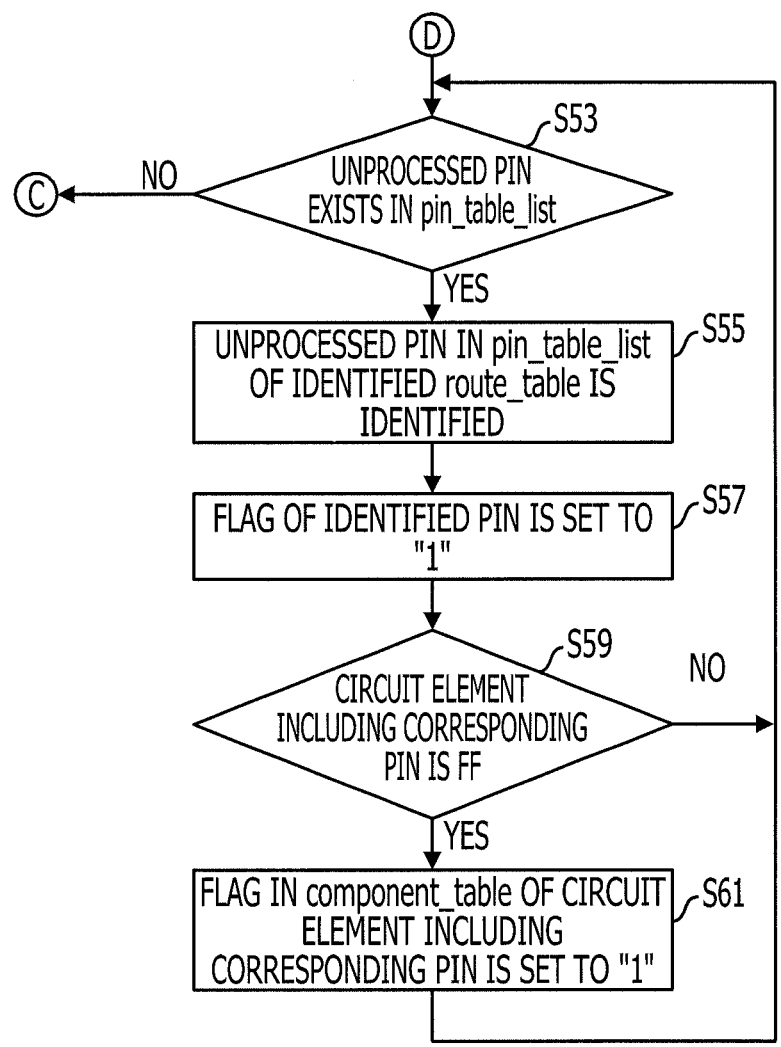
FIG. 14 illustrates an exemplary mark assignment process.

FIG. 14 illustrates an exemplary assignment process. In an operation S53 illustrated in FIG. 14, the data path search unit 3331 determines whether or not an unprocessed pin, for example, a pin table (pin_table), exists in the pin table list (pin_table_list) of the identified route table. When the unprocessed pin does not exist, the process returns to the operation S49 illustrated in FIG. 9, through a connector C illustrated in FIG. 14. When the unprocessed pin exists, the data path search unit 3331 identifies the unprocessed pin within the pin table list of the identified route table, in an operation S55. In an operation S57, the data path search unit 3331 sets, to "1", a flag in the pin table relating to the identified pin. In an operation S59, the data path search unit 3331 determines whether or not the kind of the component table of a circuit element including the identified pin is an FF. When the kind is not an FF, the process returns to the operation S53. When the kind is an FF, the data path search unit 3331 sets the flag of the corresponding component table to "1" in an operation S61, so as to trace the clock path of the FF. The process returns to the operation S53.

A forward trace or a backward trace is performed from an FF disposed within the functional block or the like of a processing target, and a flag is set in the pin of a circuit element on a route continuing until an FF is detected for the first time. Since the FF detected in the forward trace or the backward trace is a starting point from which the trace of a clock path is performed, the flag of the circuit element is also set.

Figure 15:
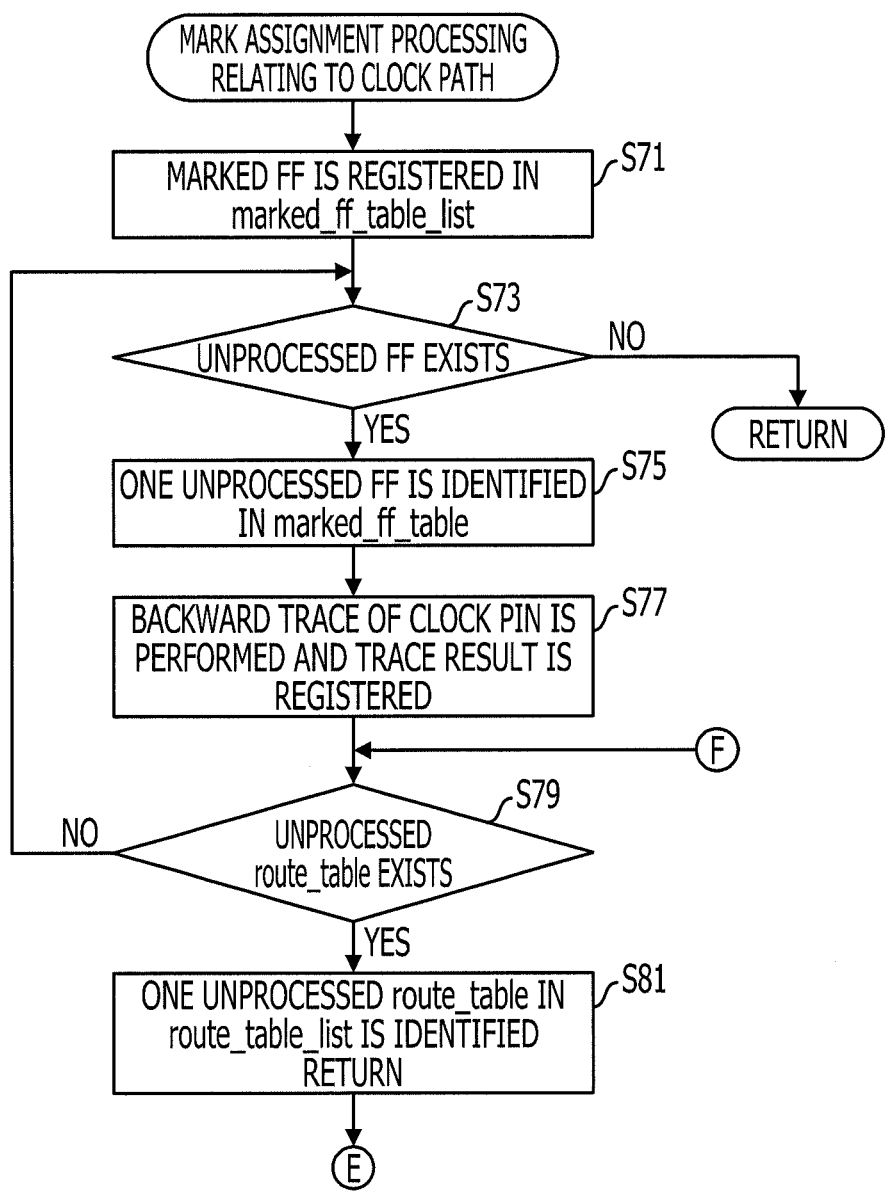
FIG. 15 illustrates an exemplary mark assignment process.

In the operation S7 illustrated in FIG. 4, the clock path search unit 3333 in the search unit 3330 performs mark assignment process relating to the clock path. FIG. 15 illustrates an exemplary mark assignment process. The mark assignment process illustrated in FIG. 15 may be the mark assignment process relating to the clock path. In an operation S71, the clock path search unit 3333 illustrated in FIG. 2 registers, in a marked FF table list (marked_ff_table_list), the component table of FFs, marked in the data structure illustrated in FIG. 7A and FIG. 7B, for example, the component table of FFs in which flags are set. In an operation S73, the clock path search unit 3333 determines whether or not an unprocessed FF exists in the marked FF table list. When the unprocessed FF does not exist, the process returns to the process of an invoker. When the unprocessed FF exits, the clock path search unit 3333 identifies the component table of the unprocessed FF in the marked FF table list, in an operation S75.

In an operation S77, the clock path search unit 3333 performs a backward trace with respect to a pin where the kind thereof within a pin table list linked from the component table of the identified FF is a clock input, and registers a trace result as the data structure of the trace.

Figure 16:
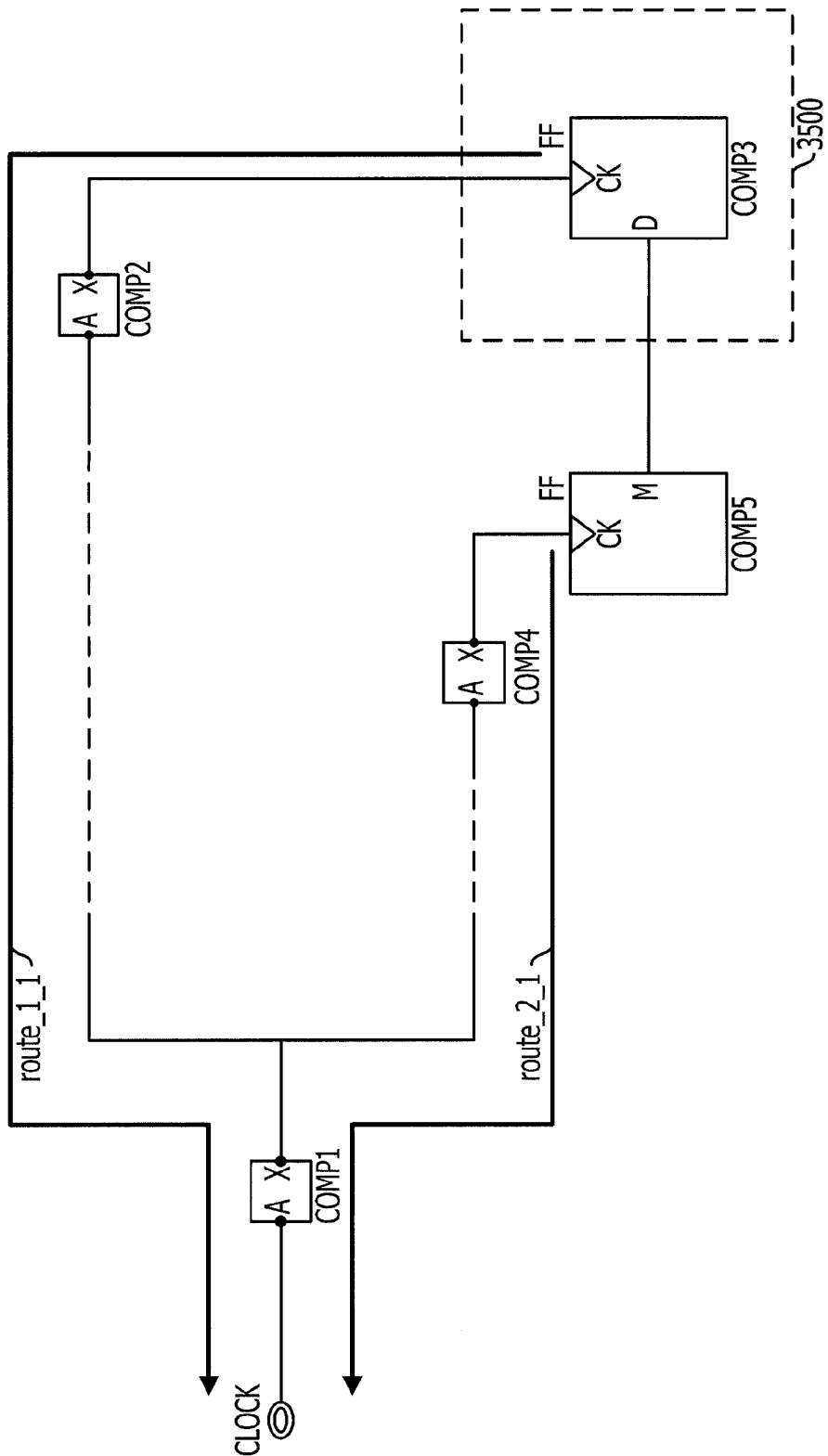
FIG. 16 illustrates an exemplary trace.

FIG. 16 illustrates an exemplary traced route. For example, in an operation S77 illustrated in FIG. 15, the trace may be executed. In a functional block 3500 or the like of a processing target, the FF (COMP3) is disposed. On the outside of the functional block 3500 or the like of a processing target, the FF (COMP5) which has been identified by the backward trace from the input pin D of the FF (COMP3) is disposed. The flags of the component tables of the FFs (COMP3 and COMP5) are set to "1", and the FFs (COMP3 and COMP5) become the targets of the trace of the clock path. A backward trace, which leads from the clock pin of the FF (COMP3) to a clock source through the output pin X and the input pin A of the circuit element COMP2, . . . , and the output pin X and the input pin A of the circuit element COMP1, is performed. The traced route may be a route 1-1 (route_1_1). A backward trace, which leads from the clock pin of the FF (COMP5) to the clock source through the output pin X and the input pin A of the circuit element COMP4, . . . , and the output pin X and the input pin A of the circuit element COMP1, is performed. The traced route may be a route 2-1 (route_2_1).

Figure 17:
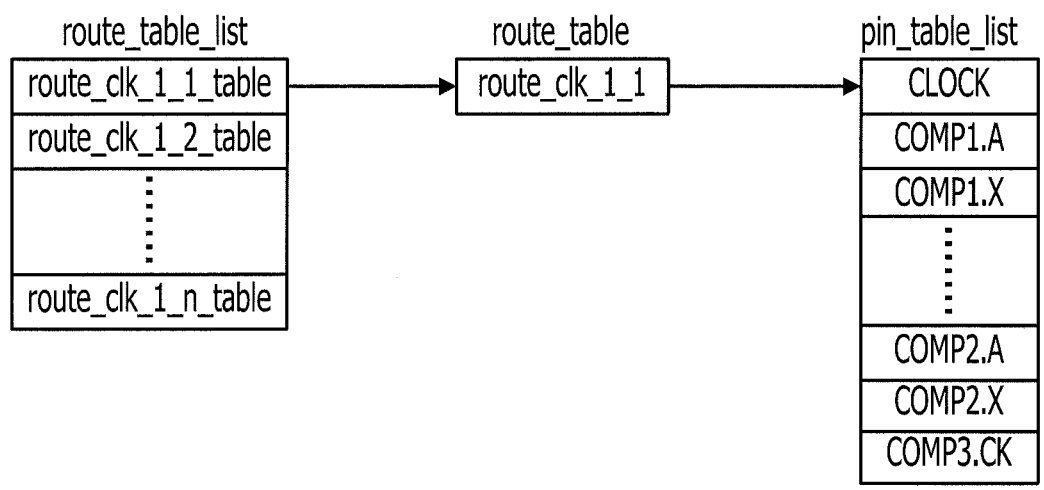
FIG. 17 illustrates an exemplary data structure.

FIG. 17 illustrates an exemplary data structure. FIG. 17 may indicate a data structure generated based on the trace from the FF (COMP3). For example, in FIG. 17, a route table list (route_table_list) is provided with respect to each FF, and a route detected with respect to an FF is registered therein.

Each registered entry is linked to a route table (route_table). The route table is linked to a pin table list (pin_table_list), and the pin table of pins detected when a route has been traced is listed. The pin table list illustrated in FIG. 17 may be the list of a pin corresponding to the route 1-1 illustrated in FIG. 16.

Figure 18:
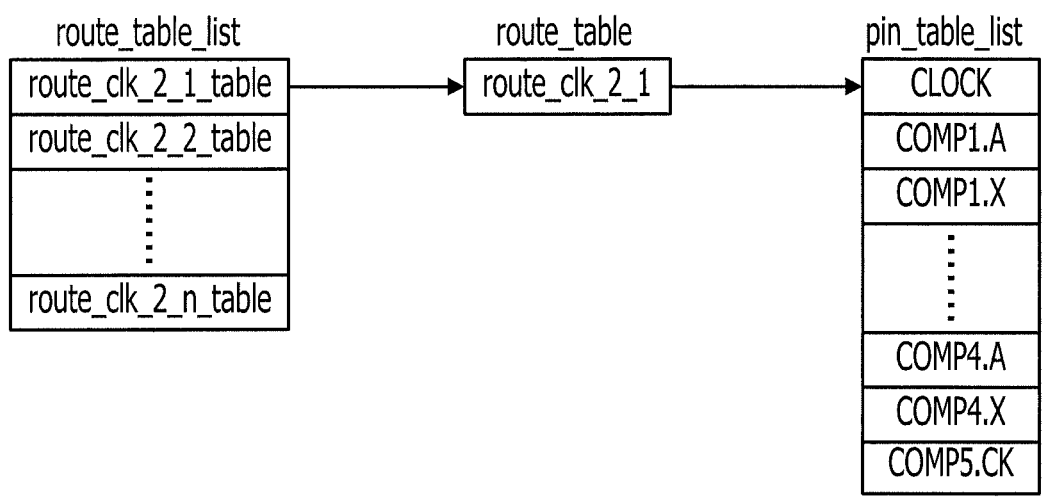
FIG. 18 illustrates an exemplary data structure.

FIG. 18 illustrates an exemplary data structure. FIG. 18 may indicate a data structure generated based on the trace from the FF (COMP5). The data structure in FIG. 18 mat be substantially the same as or similar to the data structure illustrated in FIG. 17. A pin table list illustrated in FIG. 18 may be the list of a pin corresponding to the route 2-1 illustrated in FIG. 16.

In an operation S79, the clock path search unit 3333 determines whether or not an unprocessed route table (route_table) exists in a route table list (route_table_list). When the unprocessed route table does not exist, the processing returns to the operation S73. When the unprocessed route table exists, the clock path search unit 3333 identifies the unprocessed route table in the route table list, in an operation S81. The process proceeds to process illustrated in FIG. 19, through a connector E illustrated in FIG. 15.

Figure 19:
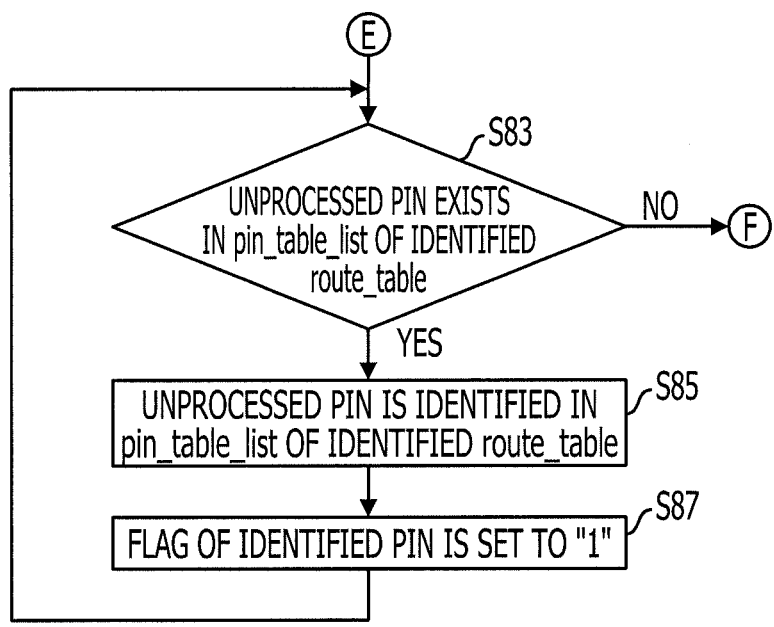
FIG. 19 illustrates an exemplary mark assignment process.

FIG. 19 illustrates an exemplary mark assignment process. In an operation S83, the clock path search unit 3333 determines whether or not an unprocessed pin exists in the pin table list (pin_table_list) of the identified route table. When the unprocessed pin does not exist, the process returns to the operation S79 illustrated in FIG. 15, through a connector F illustrated in FIG. 19. When the unprocessed pin exists, the clock path search unit 3333 identifies the unprocessed pin within the pin table list of the identified route table, in an operation S85. In an operation S87, the clock path search unit 3333 sets the flag of the pin table (pin_table) of the pin to "1". The process returns to the operation S83.

A flag is set in the pin of a circuit element on a clock path searched from the FF identified in the mark assignment process of a circuit element.

For example, in FIG. 5, with respect to the FF (L02), the FF (L03), the FF (L04), the FF (L05), the FF (L06), and the FF (L07), flags are set in the pins of gates 1110 to 1150 on a route leading to the clock source (CLK).

Figure 20:
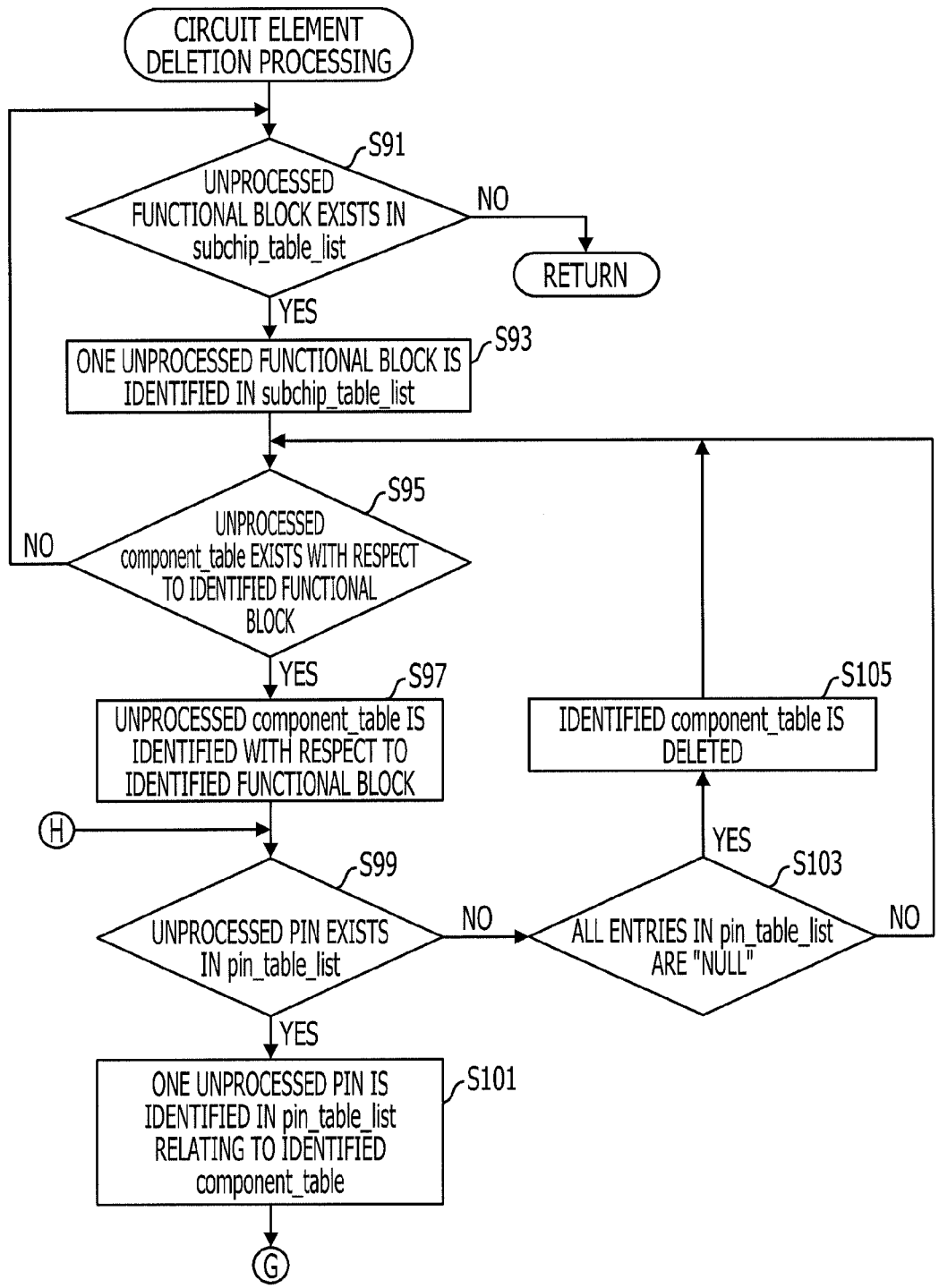
FIG. 20 illustrates an exemplary circuit element deletion processing.
Figure 21:
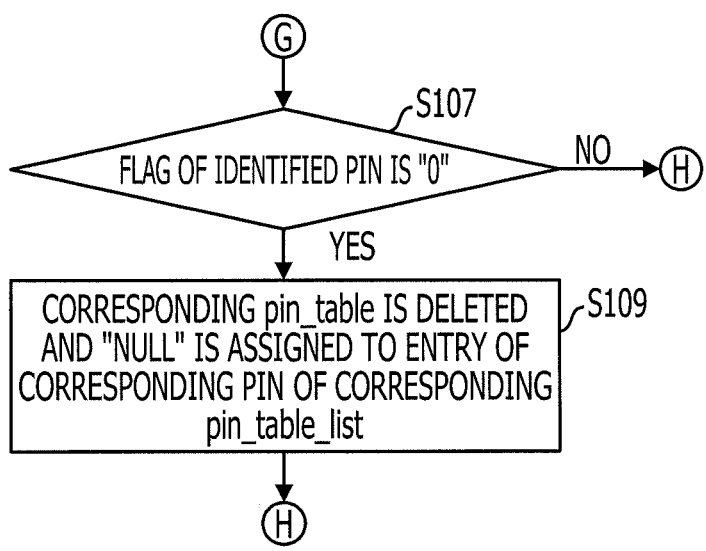
FIG. 21 illustrates an exemplary circuit element deletion processing.

In the operation S9 illustrated in FIG. 4, the circuit DB generation unit 3335 performs circuit element deletion process. FIG. 20 and FIG. 21 illustrate an exemplary circuit element deletion process. In an operation S91, the circuit DB generation unit 3335 illustrated in FIG. 2 determines whether or not an unprocessed functional block exists in a subchip table list (subchip_table_list). When the unprocessed functional block does not exist, the process returns to the process of an invoker.

When the unprocessed functional block exists, the circuit DB generation unit 3335 illustrated in FIG. 2 identifies the unprocessed functional block within the subchip table list in an operation S93. In an operation S95, the circuit DB generation unit 3335 determines whether or not an unprocessed component table (component_table) exists within a component table list (component_table_list) linked from the subchip table (subchip_table) of the identified functional block. When the unprocessed component table does not exist, the process returns to the operation S91.

When the unprocessed component table exists, the circuit DB generation unit 3335 identifies the unprocessed component table within the component table list linked from the subchip table of the identified functional block, in an operation S97. In an operation S99, the circuit DB generation unit 3335 determines whether or not an unprocessed pin exists within a pin table list (pin_table_list) linked from the identified component table.

When the unprocessed pin exists, the circuit DB generation unit 3335 identifies the unprocessed pin within the pin table list linked from the identified component table, in an operation S101. The process proceeds to process illustrated in FIG. 21, through a connector G illustrated in FIG. 20.

In an operation S109 illustrated in FIG. 1, the circuit DB generation unit 3335 determines whether or not the flag of the pin table of the identified pin has been set to "1". When the flag is "1", the process returns to the operation S99 illustrated in FIG. 20, through a connector H illustrated in FIG. 21. When the flag is "0", the circuit DB generation unit 3335 deletes data following the pin table (pin_table) and assigns "NULL" into the pin entry of the pin table list (pin_table_list), linked to the pin table, in an operation S109. The assigned "NULL" indicates that no pin exists. The process returns to the operation S99 illustrated in FIG. 20, through the connector H illustrated in FIG. 21.

When the unprocessed pin does not exist within the pin table list (pin_table_list) linked from the identified component table, the circuit DB generation unit 3335 determines whether or not all entries of the pin table list linked from the identified component table are "NULL", in an operation S103. When all entries of the pin table list are "NULL", the circuit DB generation unit 3335 deletes the identified component table, in an operation S105. A circuit element not connected to another circuit element may be deleted. The process returns to the operation S95. When a value that is not "NULL" is registered in at least one of the entries of the pin table list, the process returns to the operation S95.

A pin of a circuit element in which no flag is set is deleted, and a circuit element coupled to none of circuit elements is deleted.

In the operation S11, the circuit DB generation unit 3335 illustrated in FIG. 4 stores, in the storage device 31, the circuit data subjected to the circuit element deletion process, which is stored in the memory 35, as new circuit data at a chip level, for example, the second circuit DB 313. The structure of the circuit data may be generated using an existing generation method. Data used in the timing verification of the delay information or the like of the deleted circuit element may be deleted, and may not be included in the second circuit DB 313.

For example, a designer may be notified of the completion of the process. The second circuit DB 313 may be transmitted to the timing verification device 5 used by the designer.

Figure 22:
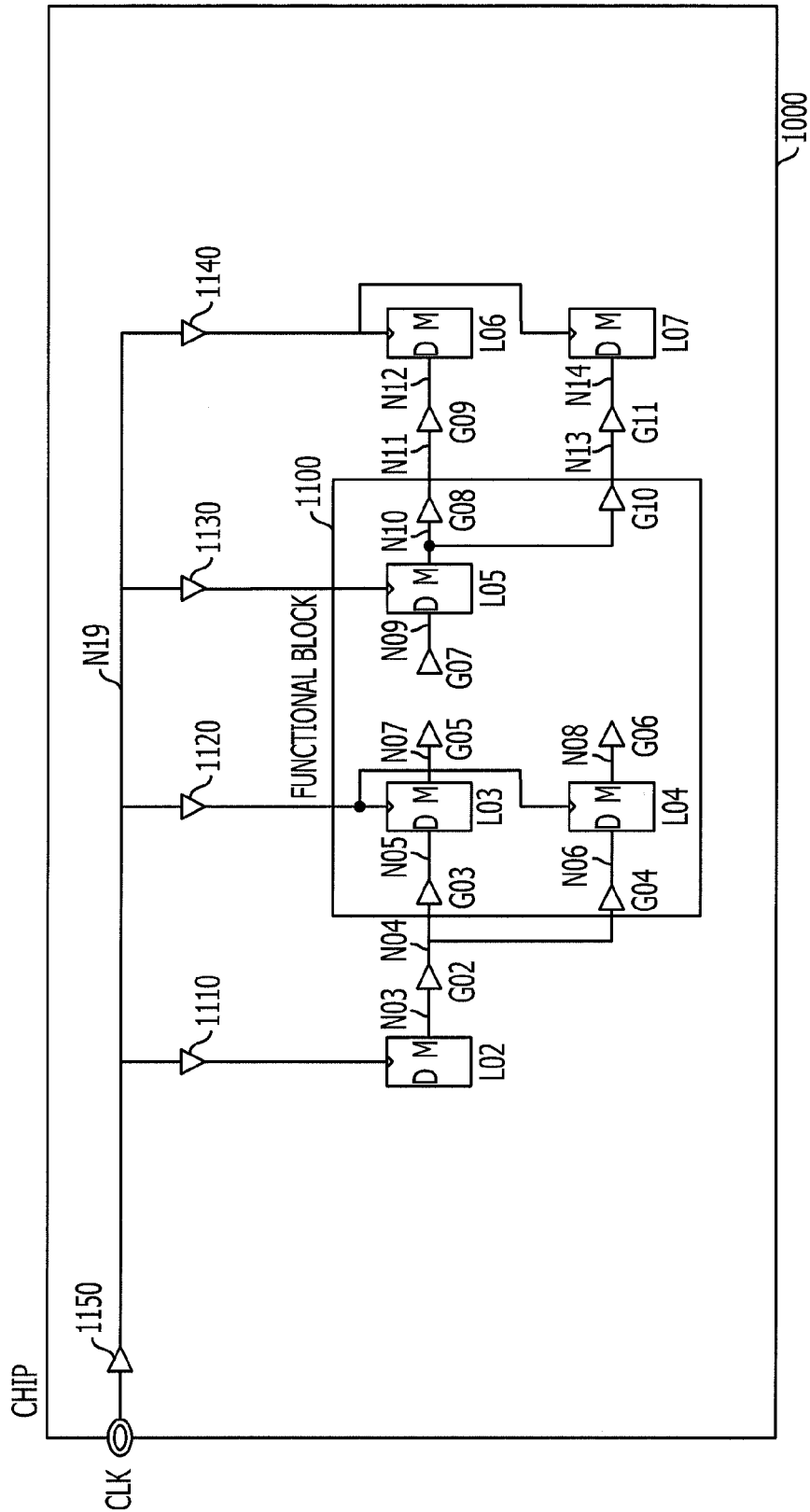
FIG. 22 illustrates an exemplary processing result.

FIG. 22 illustrates an exemplary processing result. A processing result illustrated in FIG. 22 may be the trace result of the chip illustrated in FIG. 5. In FIG. 22, a pin of a circuit element in which no flag has been set in a process is deleted, and a circuit element whose all pins has been deleted is deleted, thereby shrinking the circuit data. For example, the FF (L01), the FF (L08), the FF (L09), gates G01, G12, and G13, and gates 1160 and 1170 are deleted. For example, in the chip illustrated in FIG. 6, the FF (COMP1), the FF (COMP5), the FF (COMP6), the FF (COMP7), the FF (COMP12), the FF (COMP13), the FF (COMP14), and the FF (COMP18) are deleted.

Figure 23:
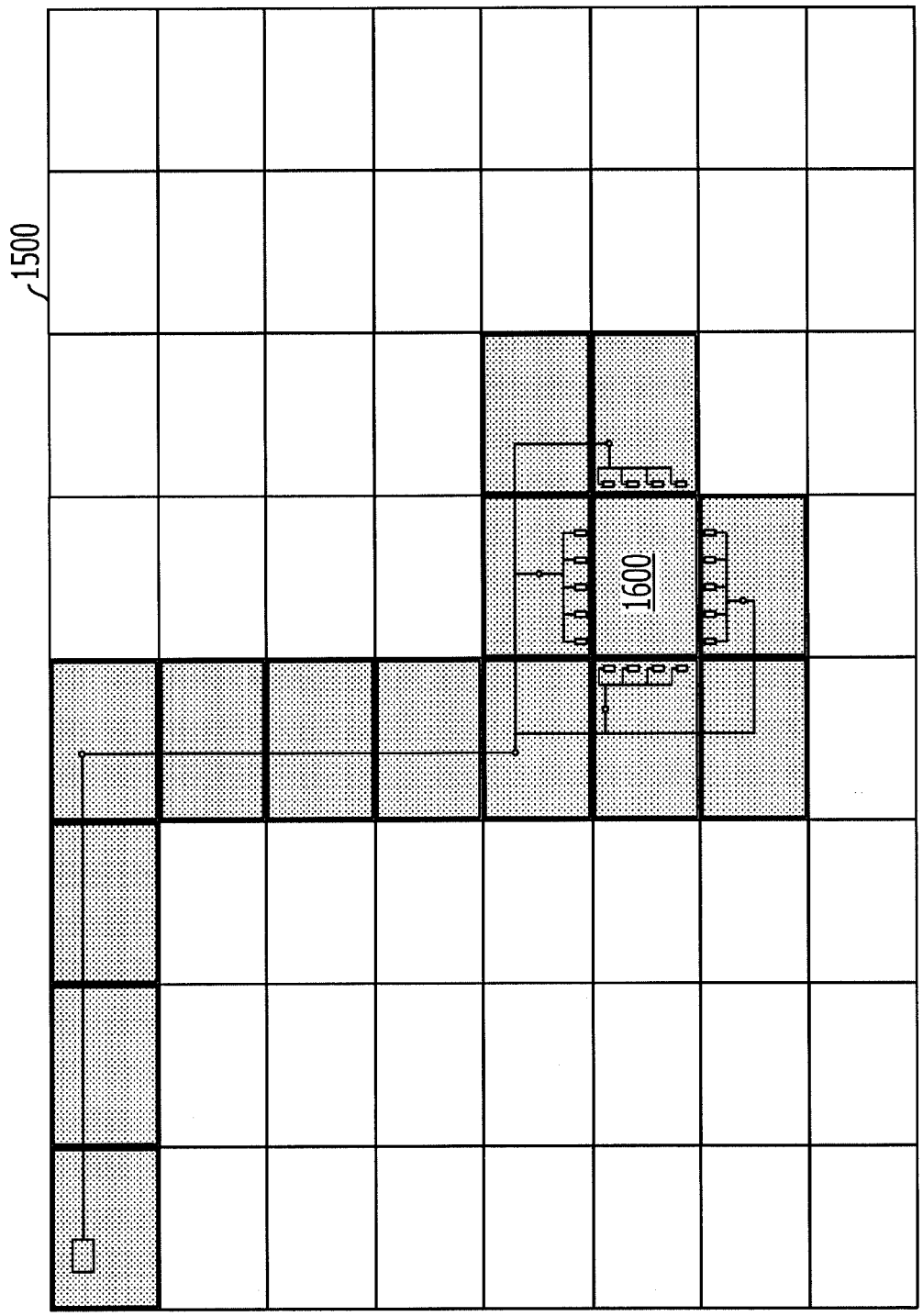
FIG. 23 illustrates an exemplary chip.

FIG. 23 illustrates an exemplary chip. For example, a chip 1500 illustrated in FIG. 23 may include 64 functional blocks. While data of all circuit elements of a functional block 1600 of a processing target is included, 14 functional blocks including paths to be traced when timing verification is performed with respect to a boundary with the functional block 1600, for example, a data path and a clock path, may include some circuit elements. 15 functional blocks hatched in FIG. 23 may include circuit elements which are detected when a data is traced from an FF within the functional block 1600 to a circuit element immediately before or immediately after an adjacent FF, an FF within the functional block 1600, and a circuit element on a clock path between adjacent FFs. Since the information of another functional block is shrunk to management information, data may be reduced. The timing verification device 5 may include a memory smaller than the memory 35 in which the circuit data of the whole chip is deployed.

Figure 24:
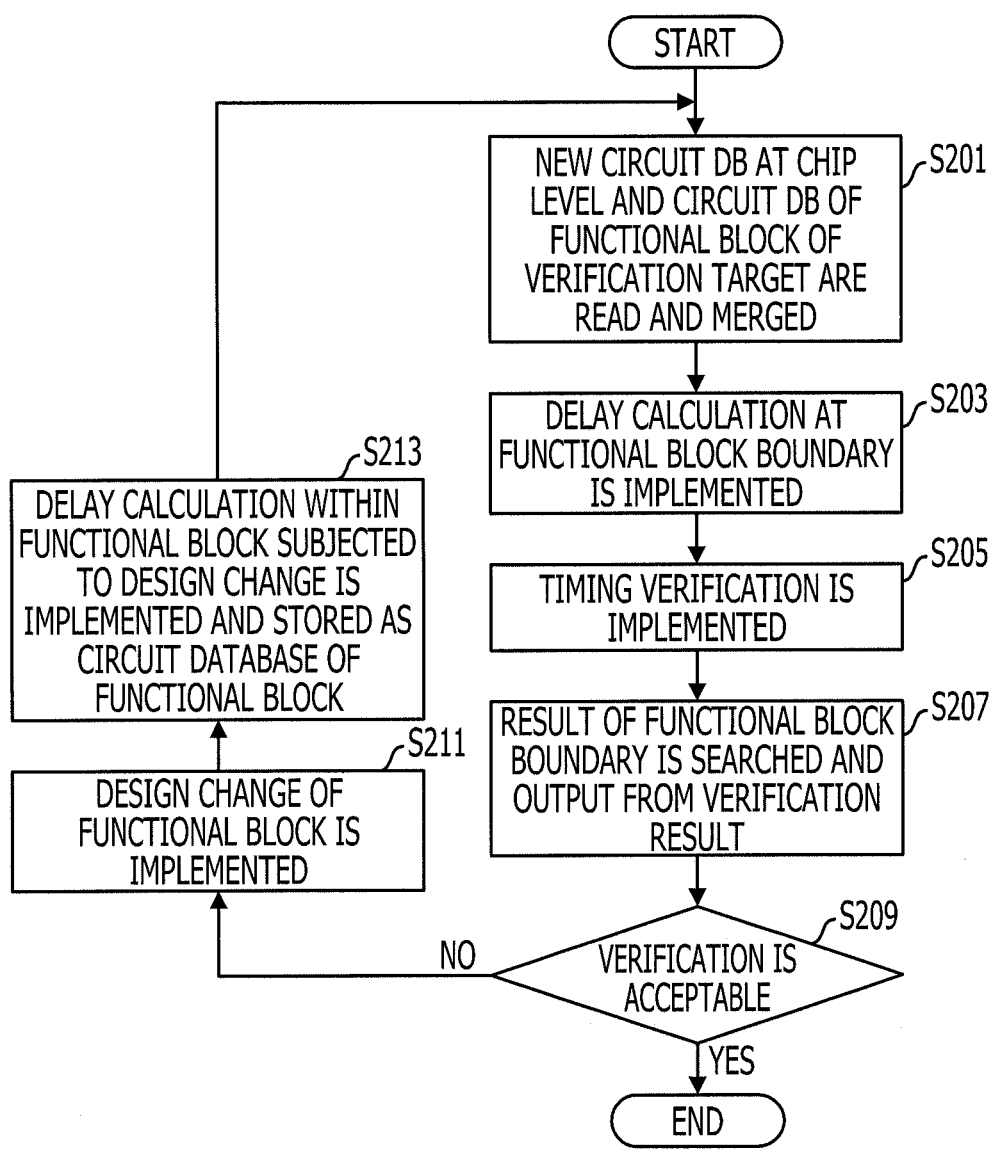
FIG. 24 illustrates an exemplary operation of a timing detection device.

FIG. 24 illustrates an exemplary process of a timing detection device. The process of the timing verification device 5 may be substantially the same as or similar to the processing of an existing timing detection device. In an operation S201, in response to an instruction from the designer of a functional block, the timing verification unit 531 in the timing verification device 5 reads, into the memory 55, a new circuit DB at a chip level, for example, the second circuit DB 313, from the storage device 51 or the storage device 31 in the timing verification support device 3, and reads, into the memory 55, the circuit data of a functional block or the like of a verification target, for example, the third circuit DB 511, from the storage device 51, thereby merging the new circuit DB and the circuit data. Circuit portions of the functional block or the like of a verification target, included in the second circuit DB 313, are substituted with the circuit data of the third circuit DB 511 and rejoined. The substitution process may be existing substitution process. When the second circuit DB 313 is generated based on the latest data of a verification target functional block or the like, for example, when process is initially performed, the third circuit DB 511 may not be merged in the operation S201.

In an operation S203, the timing verification unit 531 performs delay calculation at a functional block boundary or a boundary with a designated region, using, for example, an existing method. In an operation S205, the timing verification unit 531 performs verification, using the result of the delay calculation of the functional block boundary, for example, using an existing method. The verification result may be stored in the memory 55 or the storage device 51. In an operation S207, the timing verification unit 531 searches and outputs the result of a functional block boundary or the like to an output device (display device or the like). When the verification result has no error, the process may be terminated.

When the verification result has a problem, the design change of the functional block is performed by the timing verification device 5 or the design processing unit 533 in another device, in an operation S211. In the design change, another program such as a design tool or the like may be used. In an operation S213, the timing verification unit 531 performs delay calculation within the functional block subjected to the design change, and the circuit data of the functional block is stored in the storage device 51 as, for example, the new third circuit DB 511. The process returns to the operation S201.

In the timing verification of the functional block boundary, the circuit data of the functional block having no problem may be generated. Since the size of the second circuit DB 313 is smaller than the size of the first circuit DB 311, the capacity of the memory 55 in the timing verification device 5 may be small. Since the size of the second circuit DB 313 is small, a time taken for reading into the memory 55 is reduced and the number of focused circuits is also reduced. Therefore, a turn around time may be reduced. In the design of a functional block, a clock skew of chip design is used, and hence a clock delay may be correctly evaluated.

Data used in the timing verification of the functional block boundary may be reduced. At a chip level, the timing verification of the functional block boundary may be performed.

Figure 25:
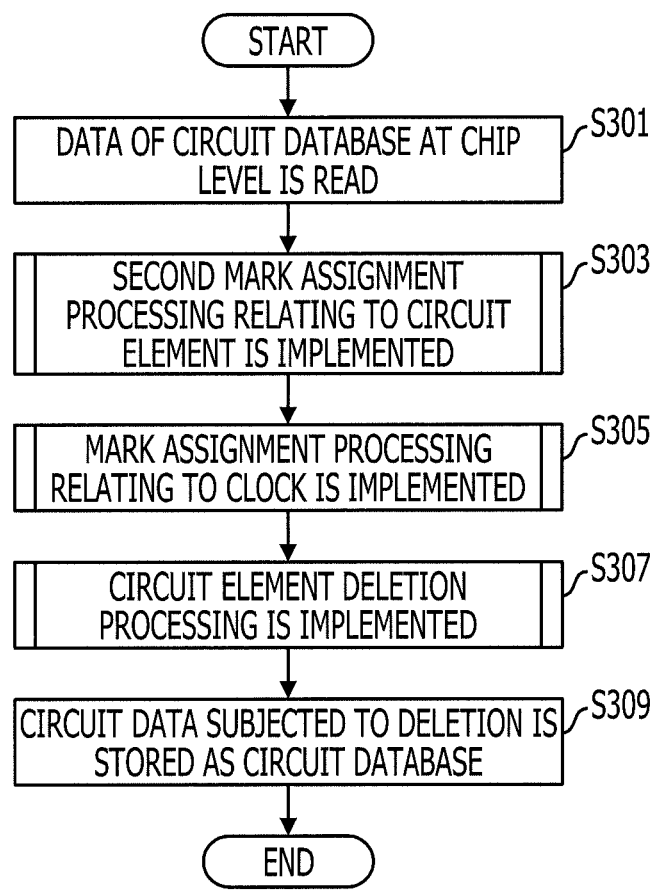
FIG. 25 illustrates an exemplary timing verification process.

FIG. 25 illustrates an exemplary timing verification process. The timing verification processing illustrated in FIG. 25 may be executed by the timing verification support device 3 illustrated in FIG. 2 or the timing verification device 5 illustrated in FIG. 3. The timing verification process illustrated in FIG. 25 may be similar to the timing verification process illustrated in FIG. 4.

In an operation S301, the timing verification support unit 333 reads, into the memory 35, the data of the first circuit DB 311 corresponding to circuit data at a chip level. For example, the data of the first circuit DB 311 may be deployed into the table structure illustrated in FIG. 7A and FIG. 7B.

Figure 26A:
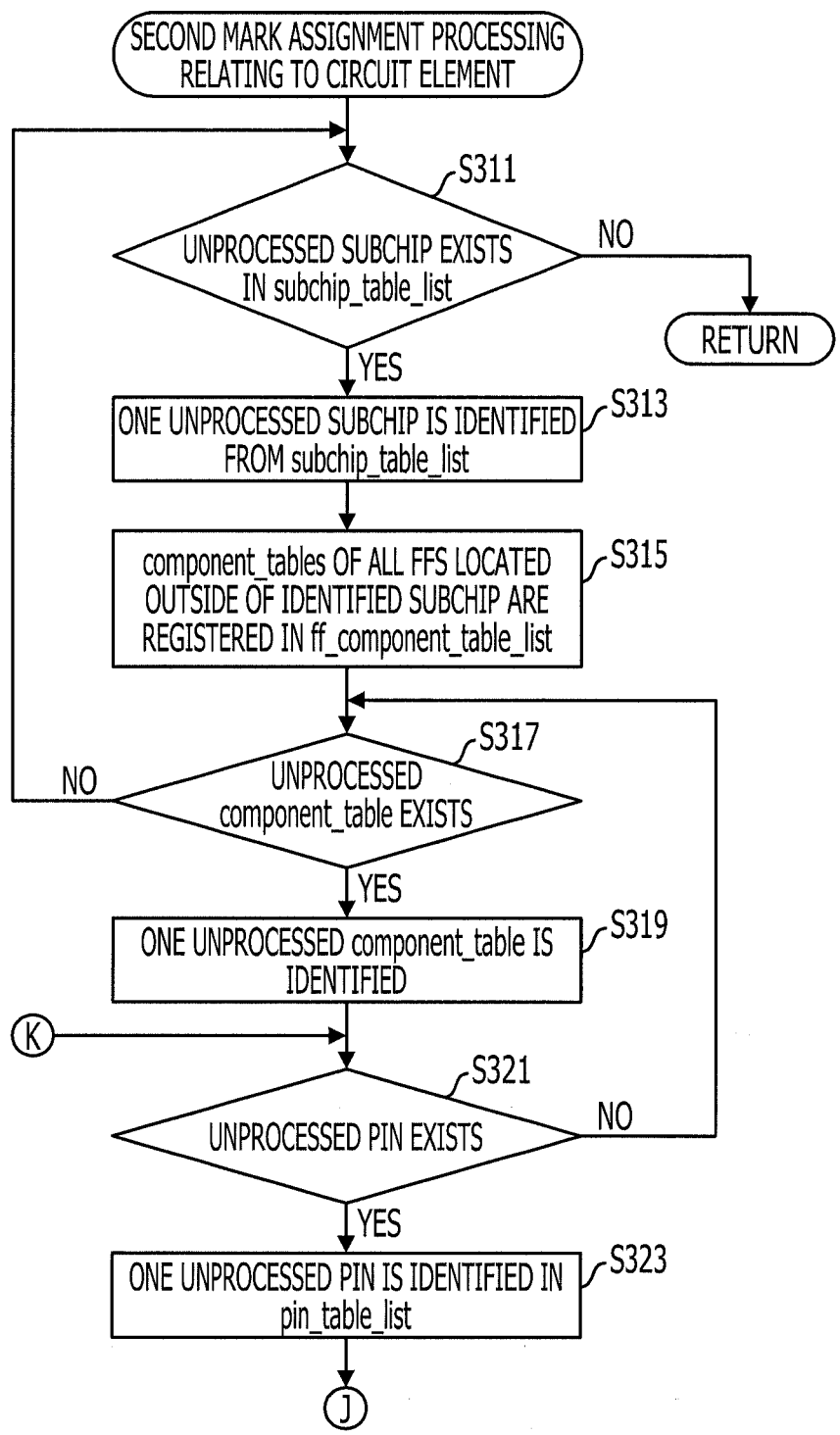
FIG. 26A, FIG. 26B, and FIG. 26C illustrate an exemplary mark assignment process.
Figure 26B:
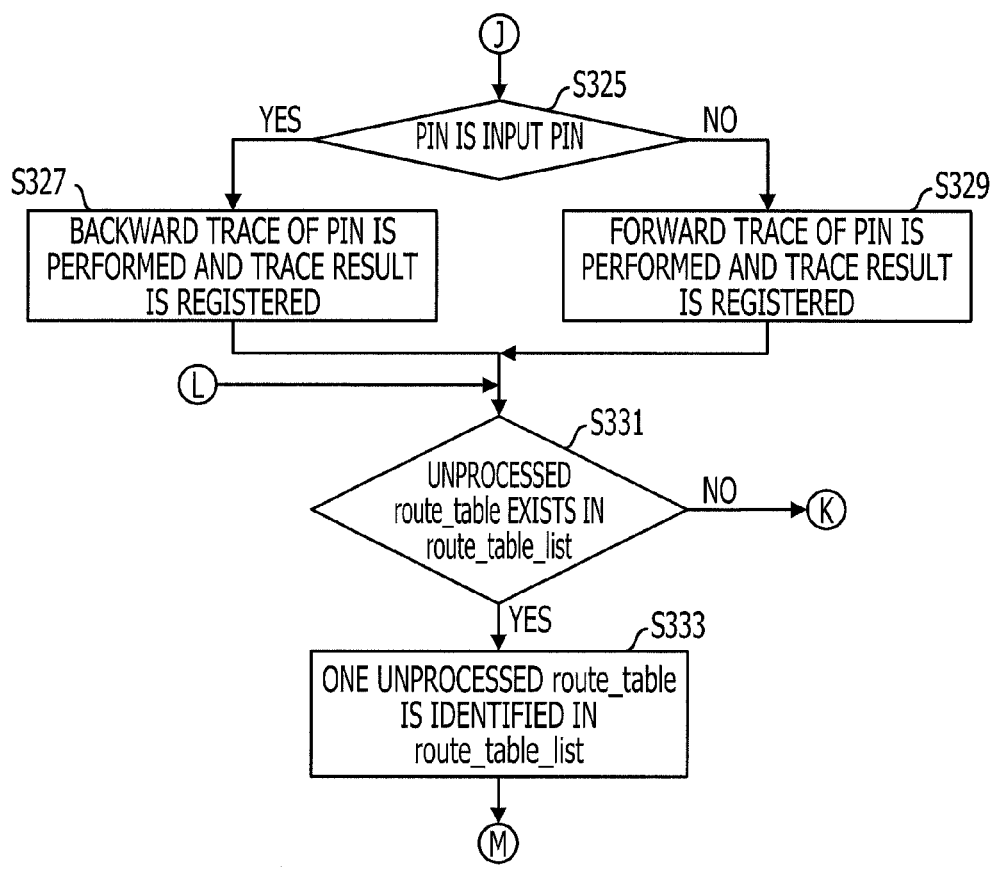
Figure 26C:
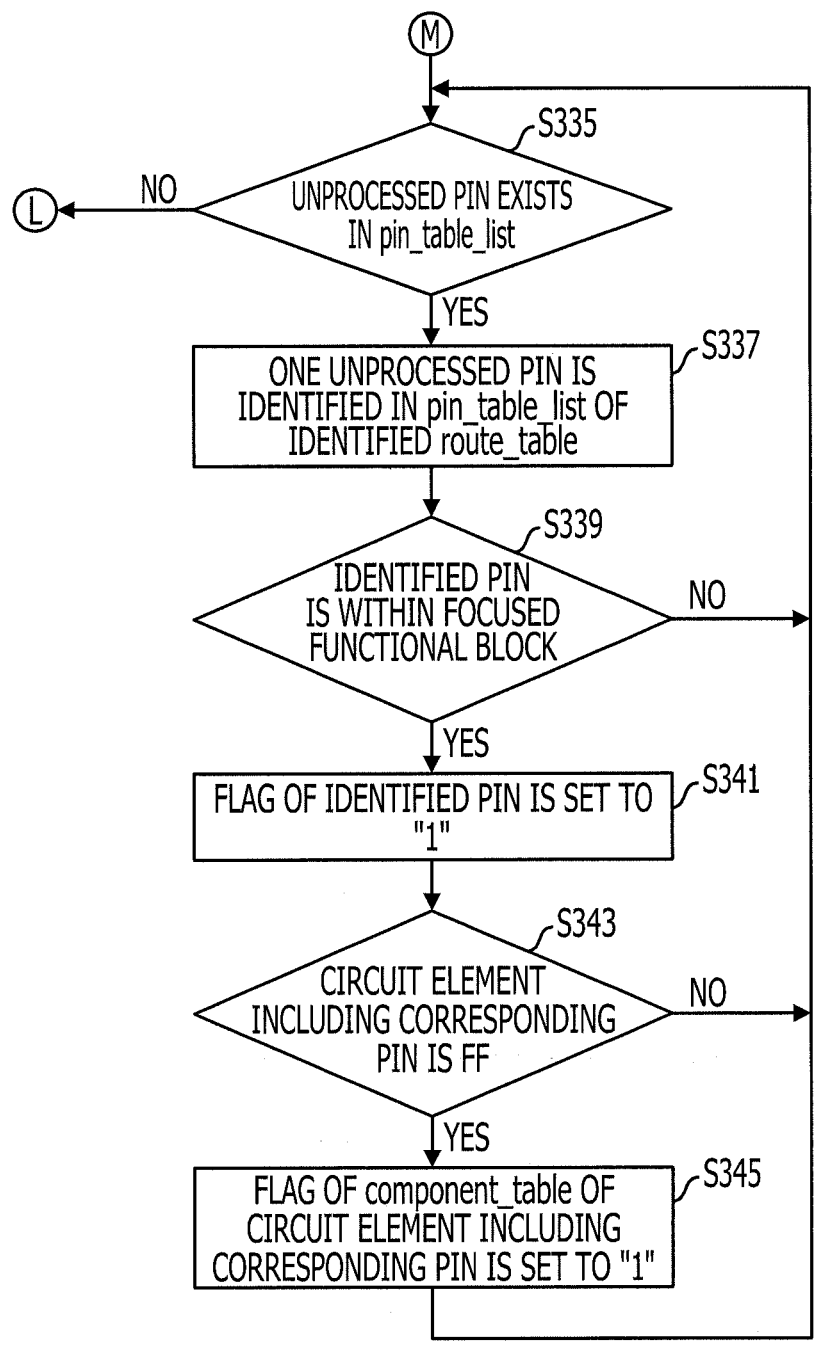

In an operation S303, the data path search unit 3331 performs second mark assignment process with respect to a circuit element. FIG. 26A, FIG. 26B, and FIG. 26C illustrate an exemplary mark assignment processing. Marks are assigned to an FF disposed at the functional block boundary of each functional block and another circuit element located outside of the FF.

In an operation S311, the data path search unit 3331 determines whether or not an unprocessed functional block exists in a subchip table list (subchip_table_list). When the unprocessed functional block does not exist, the process returns to the process of an invoker. When the unprocessed functional block exists, the data path search unit 3331 identifies the unprocessed functional block from the subchip table list in an operation S313. In an operation S315, the data path search unit 3331 registers, in an FF component table list (ff_component_table_list), the component tables (component_table) of all FFs located outside of the identified functional block. When, from the data structure in FIG. 7A and FIG. 7B, the kind of the component table of a functional block other than the identified functional block is an FF, the component table is registered in the FF component table list.

In an operation S317, the data path search unit 3331 determines whether or not an unprocessed component table exists in the FF component table list. When the unprocessed component table exists, the process returns to the operation S311. When the unprocessed component table does not exist, the data path search unit 3331 identifies the unprocessed component table in the FF component table list in an operation S309. In an operation S321, the data path search unit 3331 determines whether or not an unprocessed pin exits in a pin table list (pin_table_list) linked from the identified component table. When the unprocessed pin does not exist, the data path search unit 3331 identifies the unprocessed pin within the pin table list in an operation S323. The process proceeds to the process illustrated in FIG. 26B through a connector J illustrated in FIG. 26A.

In an operation S325, the data path search unit 3331 illustrated in FIG. 26B determines whether or not a kind in the pin table of the identified pin indicates an input pin. When the kind of pin is an input pin, the data path search unit 3331 performs the backward trace of the pin and registers a trace result as the data structure of the backward trace, in an operation S327. The backward trace and the registration processing may be substantially the same as or similar to the operation S45 illustrated in FIG. 9. The process proceeds to an operation S331.

When the kind of pin is an output pin, the data path search unit 3331 performs the forward trace of the pin and registers a trace result as the data structure of the forward trace, in an operation S329. The forward trace and the registration process may be substantially the same as or similar to the operation S47 illustrated in FIG. 9. The process proceeds to the operation S331.

In an operation S331, the data path search unit 3331 determines whether or not an unprocessed route table exists in a route table list (route_table_list) generated in the operation S327 or S329. When the unprocessed route table does not exist, the process returns to the operation S321 illustrated in FIG. 26A through a connector K illustrated in FIG. 26B. When the unprocessed route table exists, the data path search unit 3331 identifies the unprocessed route table in the route table list in an operation S333. The process proceeds to the process illustrated in FIG. 26C through a connector M illustrated in FIG. 26B.

In an operation S335 illustrated in FIG. 26C, the data path search unit 3331 determines whether or not an unprocessed pin exists in a pin table list (pin_table_list) linked from the identified route table. When the unprocessed pin does not exist, the process returns to an operation S331 illustrated in FIG. 26B through a connector L illustrated in FIG. 26C. When the unprocessed pin exists, the data path search unit 3331 identifies the unprocessed pin within the pin table list linked from the identified route table, in an operation S337. In an operation S339, from a component table or the like linked from the pin table of the identified pin, the data path search unit 3331 determines whether or not a component including the identified pin exists within a target functional block identified in the operation S313. When the component including the identified pin does not exist within the target functional block, the process returns to the operation S335 without a flag being set in the pin.

When the component including the identified pin is included within the target functional block, the data path search unit 3331 may set the flag of the pin table of the identified pin to "1" in an operation S341. In an operation S343, the data path search unit 3331 determines whether or not the kind of the component table of a circuit element including the identified pin indicates an FF. When the kind is not an FF, since clock path search is not performed, the process returns to an operation S335. When the kind is an FF, the data path search unit 3331 sets the flag of the component table of the circuit element including the pin to "1" in an operation S345. An FF where the clock path search is to be performed is identified. The process returns to the operation S335.

Figure 27:
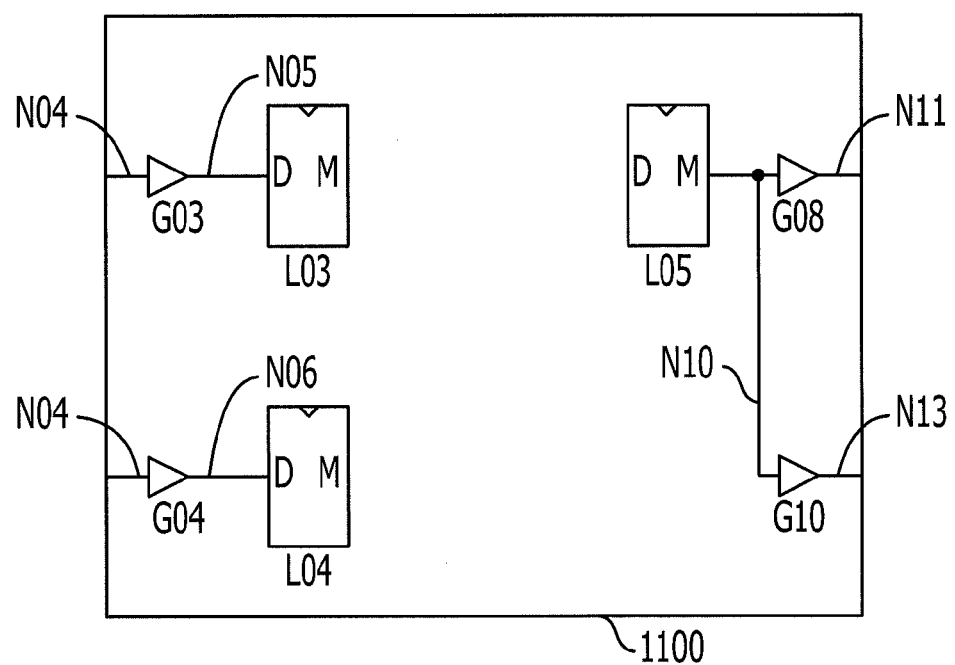
FIG. 27 illustrates an exemplary chip.

Marks are assigned to an FF disposed at a functional block boundary and another circuit element located outside of the FF. FIG. 27 illustrates an exemplary chip. In the same way as the chip illustrated in FIG. 5, marks are assigned to some circuit elements within the functional block 1100 illustrated in FIG. 27. For example, marks may not be assigned to the pins of the gates G05 to G07 from among the FF (L03), the FF (L04), the FF (L05), the gate G03 to the gate G08, and the gate G10, included in the functional block 1100.

In the operation S305 illustrated in FIG. 25, the clock path search unit 3333 performs the mark assignment process of a clock. The mark assignment process may be substantially the same as or similar to the operation S7 illustrated in FIG. 4, for example, the mark assignment process illustrated in FIG. 15 or FIG. 19. A mark is assigned to the pin of a circuit element on a clock path from the marked FF.

Figure 28:
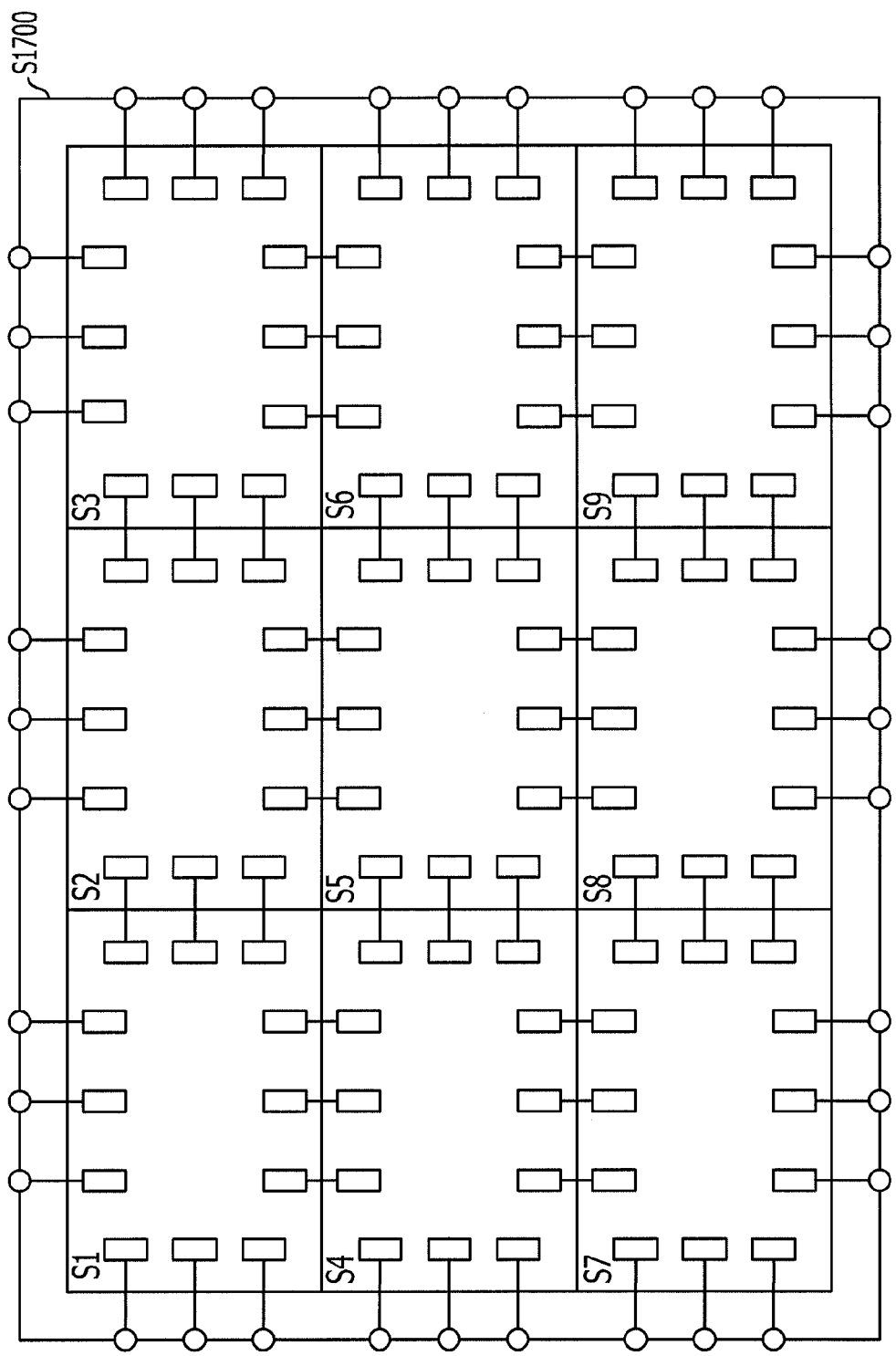
FIG. 28 illustrates an exemplary chip.
Figure 29:
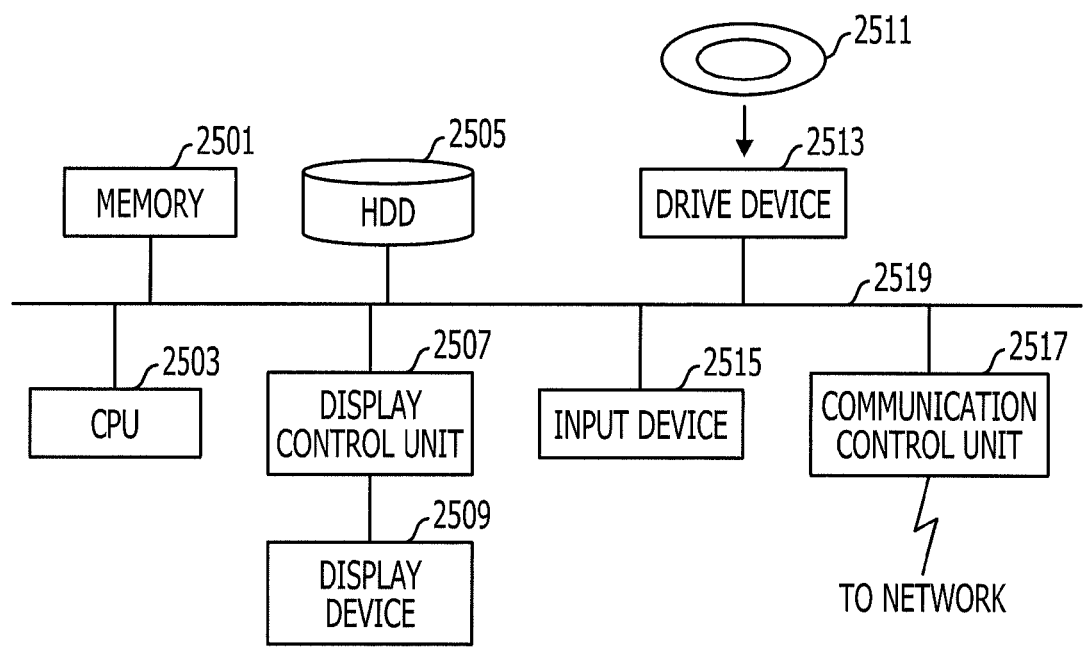
FIG. 29 illustrates an exemplary system.

In the operation S307, the circuit DB generation unit 3335 performs circuit element deletion process. The circuit element deletion process may be substantially the same as or similar to the operation S9 illustrated in FIG. 4, for example, the circuit element deletion process illustrated in FIG. 20 or FIG. 21. A circuit element on a data path between FFs disposed at a functional block boundary and a circuit element on a clock path from the FF may be extracted. FIG. 28 illustrates an exemplary chip. For example, circuit data corresponding to a circuit illustrated in FIG. 28 is generated. For example, FFs disposed in the vicinity of a functional block boundary, coupled across the functional block boundary, and indicated by rectangles and circuit elements (circles) on the clock path 1700 of the FFs are extracted. In FIG. 29, the clock path 1700 may be coupled to an FF only indicating a connection between FFs.

In an operation S309, the circuit DB generation unit 3335 stores, in the storage device 31, circuit data in the memory 35 obtained by performing the circuit element deletion process on, as new circuit data at a chip level, for example, second circuit DB 313. The second circuit DB 313 may be different from the second circuit DB 313 generated by the timing verification process illustrated in FIG. 4. The circuit data may be generated using an existing method. Data not to be used in the timing verification, such as the delay information of a deleted circuit element or the like, may be deleted, and may not be included in the second circuit DB 313.

The designer of a chip level performs the timing verification of a functional block boundary using, for example, the timing verification device 5. Circuits within the functional block are also limited to part thereof, and the functional block may not be merged with the third circuit DB 511. When an error is detected in the verification process, the designer of a chip level requests an amendment the designer of a functional block in which the error has been detected, for example. After the error has been amended, the above-mentioned process is re-executed, and the second circuit DB 313 relating to the functional block boundaries of the whole chip is generated, thereby executing the timing verification process.

Since the second circuit DB 313 including the deleted data is used, the timing verification process may be executed by the timing verification device 5 having a small memory capacity.

For example, as long as a processing result does not change, the order of operations may be changed, and the operations may be executed in parallel. The above-mentioned functional block may not coincide with a program module configuration.

FIG. 29 illustrates an exemplary system. For example, the timing verification device 5 and the timing verification support device 3, illustrated in FIG. 1, may be a computer device. In the timing verification device 5 and the timing verification support device 3, a memory 2501, a central processing unit (CPU) 2503, a hard disk drive (HDD) 2505, a display control unit 2507 coupled to a display device 2509, a drive device 2513 used for a removable disk 2511, an input device 2515, and a communication control unit 2517 used for connecting to a network are coupled to one another through a bus 2519. An operating system (OS) and an application program used for performing the above-mentioned process are stored in the HDD 2505. The program is read from the HDD 2505 into the memory 2501 and executed by the CPU 2503. In response to the content of process of the application program, the CPU 2503 controls the display control unit 2507, the communication control unit 2517, and the drive device 2513. Data being subjected to process may be stored in the memory 2501, and may also be stored in the HDD 2505. The application program used for performing the above-mentioned process may be stored in the computer-readable removable disk 2511 and distributed. The application program is installed from the drive device 2513 into the HDD 2505. The application program may be installed into the HDD 2505 through a network such as Internet or the like and the communication control unit 2517. The computer device may execute the above-mentioned process in cooperation with hardware such as the CPU 2503 and the memory 2501 and programs such as the OS and the application program.

For example, the program used for causing the computer to execute the above-mentioned process may be stored in a computer-readable storage medium or a storage device, such a flexible disk, an optical disk such as a CD-ROM, a magnetooptical disk, a semiconductor memory (for example, a ROM), a hard disk, or the like. Data being subjected to process may be temporarily stored in a storage device such as a RAM or the like.

Example embodiments of the present invention have now been described in accordance with the above advantages. It will be appreciated that these examples are merely illustrative of the invention. Many variations and modifications will be apparent to those skilled in the art.

The invention claimed is:

1. A timing verification support device comprising:
   a storage device to store first circuit data of a semiconductor integrated circuit;
   a search unit to identify, in the first circuit data, a plurality of circuit elements including a designated circuit element designated as a timing verification target and at least one circuit element included in a path traced when performing timing verification at a boundary between the designated circuit element and a portion other than the designated circuit element; and
   a generation unit to generate second circuit data for the timing verification including circuit data of the indentified plurality of circuit elements, a data size of the second circuit data being smaller than a data size of the first circuit data,
   wherein the first circuit data includes a first flag indicating a circuit element terminal included in the second circuit data and a second flag indicating whether or not a circuit element corresponding to the circuit element terminal is a sequential circuit,
   wherein the data path search unit sets, to an on-state, the first flag of a circuit element terminal located on a data path from a sequential circuit included in the designated circuit element to the other sequential circuit, and sets the second flag to an off-state when a circuit element corresponding to the circuit element terminal is a sequential circuit.

2. The timing verification support device according to claim 1, wherein
   the search unit includes:
   a data path search unit to identify a circuit element by tracing a data path in a forward direction and a reverse direction from a sequential circuit included in the designated circuit element to the other sequential circuit; and
   a clock path search unit to identify a circuit element included in a clock path of the other sequential circuit.

3. The timing verification support device according to claim 1, wherein
   the clock path search unit sets, to an on-state, the first flag of a circuit element terminal on a clock path of a sequential circuit having the second flag indicating an on-state.

4. The timing verification support device according to claim 1, wherein the generation unit deletes data of a circuit element terminal having the first flag indicating an off-state from the first circuit data, deletes data of a circuit element from which data of a circuit element terminal is deleted, and generates the second circuit data.

5. The timing verification support device according to claim 1, wherein the generation unit stores the second circuit data in the storage device.

6. A timing verification support device comprising:
   a storage device to store first circuit data of a semiconductor integrated circuit;
   a search unit to identify a first circuit element group between sequential circuits coupled across a boundary between a plurality of functional blocks obtained by dividing the semiconductor integrated circuit in units of functions, and a second circuit element group included in a path supplying a clock to the first circuit element group, the first circuit element group being included in the first circuit data; and
   a generation unit to generate second circuit data for timing verification relating to the boundary between the plurality of functional blocks, the second circuit data including circuit data of the identified first circuit element group or the identified second circuit element group, and store the second circuit data in the storage device, a data size of the second circuit data being smaller than a data size of the first circuit data,
   wherein the first circuit data includes a first flag indicating a circuit element terminal included in the second circuit data and a second flag indicating whether or not a circuit element including the circuit element terminal is a sequential circuit,
   wherein the data path search unit sets, to an on-state, the first flag of a circuit element terminal included in the first functional block from among circuit element terminals located on a data path from a sequential circuit included in the second functional block to the other circuit, and sets the second flag to an off-state when a circuit element corresponding to the circuit element terminal is a sequential circuit.

7. The timing verification support device according to claim 6, wherein
   the search unit includes:
   a data path search unit to identify a circuit element in a first functional block by tracing a data path in a forward direction and a reverse direction from a sequential circuit included in a second functional block other than the first functional block in the plurality of functional blocks to the other sequential circuit; and
   a clock path search unit to identify a circuit element included in a clock path of the other sequential circuit.

8. The timing verification support device according to claim 6, wherein
   the clock path search unit sets, to an on-state, the first flag of a circuit element terminal on a clock path of a sequential circuit having the second flag indicating an on-state.

9. The timing verification support device according to claim 6, wherein
   the generation unit deletes data of a circuit element terminal having the first flag indicating an off-state from the first circuit data, deletes data of a circuit element from which data of a circuit element terminal is deleted, and generates the second circuit data.

10. The timing verification support device according to claim 6, wherein
    the generation unit stores the second circuit data in the storage device.

11. A timing verification support method comprising:
    identifying, by a computer, from first circuit data of a semiconductor integrated circuit in a storage device, a plurality of circuit elements including a designated circuit element designated as a timing verification target and at least one circuit element included in a path traced when performing timing verification at a boundary between the designated circuit element and a portion other than the designated circuit element; and generating second circuit data for the timing verification including circuit data of the identified plurality of circuit elements, a data size of the second circuit data being smaller than a data size of the first circuit data; and setting, to an on-state, a first flag of a circuit element terminal included in the first functional block from among circuit element terminals located on a data path from a sequential circuit included in the second functional block to the other circuit, and sets a second flag to an off-state when a circuit element corresponding to the circuit element terminal is a sequential circuit, wherein the first circuit data includes a first flag indicating a circuit element terminal included in the second circuit data and a second flag indicating whether or not a circuit element including the circuit element terminal is a sequential circuit.

12. A timing verification support method comprising:

identifying, by a computer, a first circuit element group between sequential circuits coupled across a boundary between a plurality of functional blocks obtained by dividing the semiconductor integrated circuit in units of functions, and a second circuit element group included in a path supplying a clock to the first circuit element group, the first circuit element group being included in a first circuit data in a storage device;

generating second circuit data for timing verification relating to the boundary between the plurality of functional blocks, the second circuit data including circuit data of the identified first circuit element group or the identified second circuit element group, and store the second circuit data in the storage device, a data size of the second circuit data being smaller than a data size of the first circuit data; and setting, to an on-state, a first flag of a circuit element terminal included in the first functional block from among circuit element terminals located on a data path from a sequential circuit included in the second functional block to the other circuit, and sets a second flag to an off-state when a circuit element corresponding to the circuit element terminal is a sequential circuit, wherein the first circuit data includes a first flag indicating a circuit element terminal included in the second circuit data and a second flag indicating whether or not a circuit element including the circuit element terminal is a sequential circuit.

13. The timing verification support method according to claim 11, further comprising, setting, to an on-state, the first flag of a circuit element terminal on a clock path of a sequential circuit having the second flag indicating an on-state.

14. The timing verification support method according to claim 11, further comprising:

deleting data of a circuit element terminal having the first flag indicating an off-state from the first circuit data;

deleting data of a circuit element from which data of a circuit element terminal is deleted; and generating the second circuit data.

15. The timing verification support method according to claim 12, further comprising, setting, to an on-state, the first flag of a circuit element terminal on a clock path of a sequential circuit having the second flag indicating an on-state.

16. The timing verification support method according to claim 12, further comprising:

deleting data of a circuit element terminal having the first flag indicating an off-state from the first circuit data;

deleting data of a circuit element from which data of a circuit element terminal is deleted; and generating the second circuit data.

* * * * *

UNITED STATES PATENT AND TRADEMARK OFFICE
CERTIFICATE OF CORRECTION

| | | |
|---|---|---|
| PATENT NO. | : 8,572,531 B2 | Page 1 of 1 |
| APPLICATION NO. | : 13/406906 | |
| DATED | : October 29, 2013 | |
| INVENTOR(S) | : Katsumi Iguchi | |

It is certified that error appears in the above-identified patent and that said Letters Patent is hereby corrected as shown below:

In the Claims

In Column 15, Lines 31-32, In Claim 1, delete "indentified" and insert -- identified --, therefor.

Signed and Sealed this
Twenty-eighth Day of January, 2014

Michelle K. Lee
*Deputy Director of the United States Patent and Trademark Office*